United States Patent
Hull et al.

(10) Patent No.: US 7,864,352 B2
(45) Date of Patent: Jan. 4, 2011

(54) PRINTER WITH MULTIMEDIA SERVER

(75) Inventors: Jonathan J. Hull, San Carlos, CA (US);
Jamey Graham, San Jose, CA (US);
Peter E. Hart, Menlo Park, CA (US);
Kurt W. Piersol, Santa Cruz, CA (US)

(73) Assignee: Ricoh Co. Ltd., Tokyo (JP)

( * ) Notice: Subject to any disclaimer, the term of this patent is extended or adjusted under 35 U.S.C. 154(b) by 1416 days.

(21) Appl. No.: 10/814,842

(22) Filed: Mar. 30, 2004

(65) Prior Publication Data

US 2005/0068581 A1    Mar. 31, 2005

Related U.S. Application Data

(60) Provisional application No. 60/506,206, filed on Sep. 25, 2003, provisional application No. 60/506,263, filed on Sep. 25, 2003, provisional application No. 60/506,302, filed on Sep. 25, 2003, provisional application No. 60/506,303, filed on Sep. 25, 2003, provisional application No. 60/506,411, filed on Sep. 25, 2003.

(51) Int. Cl.
| | |
|---|---|
| *G06K 15/00* | (2006.01) |
| *H04N 5/91* | (2006.01) |
| *G11B 7/085* | (2006.01) |
| *G06F 15/80* | (2006.01) |
| *G06F 15/177* | (2006.01) |
| *G06F 3/12* | (2006.01) |
| *G06K 9/00* | (2006.01) |
| *G06Q 40/00* | (2006.01) |

(52) U.S. Cl. ............. 358/1.15; 386/46; 369/30.85; 345/505; 382/118; 382/170; 235/379; 709/220

(58) Field of Classification Search .......... 358/1.16, 358/1.15; 707/10
See application file for complete search history.

(56) References Cited

U.S. PATENT DOCUMENTS 4,133,007 A    1/1979    Wessler et al.

(Continued)

FOREIGN PATENT DOCUMENTS

CA    2386829    11/2002

(Continued)

OTHER PUBLICATIONS

ASCII 24.com, [online] (date unknown), Retrieved from the Internet<URL: http://216.239.37.104/search?q=cache:z-G9M1EpvSUJ:ascii24.com/news/i/hard/article/1998/10/01/612952-000.html+%E3%82%B9%E370...>.

(Continued)

*Primary Examiner*—Edward L Coles
*Assistant Examiner*—Neil R McLean
(74) *Attorney, Agent, or Firm*—Patent Law Works LLP

(57) ABSTRACT

A printer with an embedded multimedia server is described that includes a processor primarily allocated for print control and another processor for executing a multimedia server for interfacing with hardware and/or software interfaces for various forms of media. Examples of such interfaces include, a network interface, a VGA port, transcoding hardware, wireless interfaces and a (USB) port. Examples of types of media processed include video, audio and text. The multimedia server performs multimedia content processing, particularly for time-based data, examples of which include editing, formatting, scheduling capture of content, searching, recognition, and event detection. Additionally, the printer can provide a multimedia storage database. The printer provides a user interface on its chassis that can provide a web browser, so that a user can interact directly with the printer for indicating preferences for multimedia content processing and/or selection for printing onto a desired output medium.

40 Claims, 9 Drawing Sheets

U.S. PATENT DOCUMENTS

| | | | |
|---|---|---|---|
| 4,205,780 A | 6/1980 | Burns et al. | |
| 4,619,522 A | 10/1986 | Imai | |
| 4,635,132 A | 1/1987 | Nakamura | |
| 4,703,366 A * | 10/1987 | Kobori et al. | 386/46 |
| 4,734,898 A * | 3/1988 | Morinaga | 369/30.85 |
| 4,754,485 A | 6/1988 | Klatt | |
| 4,807,186 A | 2/1989 | Ohnishi et al. | |
| 4,831,610 A | 5/1989 | Hoda et al. | |
| 4,881,135 A | 11/1989 | Heilweil | |
| 4,907,973 A | 3/1990 | Hon | |
| 4,998,215 A | 3/1991 | Black et al. | |
| 5,010,498 A | 4/1991 | Miyata | |
| 5,059,126 A | 10/1991 | Kimball | |
| 5,091,948 A | 2/1992 | Kametani | |
| 5,093,730 A | 3/1992 | Ishii et al. | |
| 5,111,285 A | 5/1992 | Fujita et al. | |
| 5,115,967 A | 5/1992 | Wedekind | |
| 5,136,563 A | 8/1992 | Takemasa et al. | |
| 5,170,935 A | 12/1992 | Federspiel et al. | |
| 5,220,649 A | 6/1993 | Forcier | |
| 5,231,698 A | 7/1993 | Forcier | |
| 5,237,648 A | 8/1993 | Mills et al. | |
| 5,270,989 A | 12/1993 | Kimura | |
| 5,343,251 A | 8/1994 | Nafeh | |
| 5,386,510 A | 1/1995 | Jacobs | |
| 5,428,555 A | 6/1995 | Starkey et al. | |
| 5,432,532 A | 7/1995 | Mochimaru et al. | |
| 5,436,792 A | 7/1995 | Leman et al. | |
| 5,438,426 A | 8/1995 | Miake et al. | |
| 5,444,476 A | 8/1995 | Conway | |
| 5,479,600 A | 12/1995 | Wroblewski et al. | |
| 5,480,306 A | 1/1996 | Liu | |
| 5,485,554 A | 1/1996 | Lowitz et al. | |
| 5,493,409 A | 2/1996 | Maeda et al. | |
| 5,524,085 A | 6/1996 | Bellucco et al. | |
| 5,566,271 A | 10/1996 | Tomitsuka et al. | |
| 5,568,406 A | 10/1996 | Gerber | |
| 5,572,651 A | 11/1996 | Weber et al. | |
| 5,576,950 A | 11/1996 | Tonomura et al. | |
| 5,581,366 A | 12/1996 | Merchant et al. | |
| 5,590,257 A | 12/1996 | Forcier | |
| 5,596,698 A | 1/1997 | Morgan | |
| 5,617,138 A | 4/1997 | Ito et al. | |
| 5,624,265 A | 4/1997 | Redford et al. | |
| 5,627,936 A | 5/1997 | Prasad et al. | |
| 5,628,684 A | 5/1997 | Bouedec | |
| 5,633,723 A * | 5/1997 | Sugiyama et al. | 358/296 |
| 5,640,193 A | 6/1997 | Wellner | |
| 5,661,506 A | 8/1997 | Lazzouni et al. | |
| 5,661,783 A | 8/1997 | Assis | |
| 5,682,330 A | 10/1997 | Seaman et al. | |
| 5,682,540 A | 10/1997 | Klotz, Jr. et al. | |
| 5,690,496 A | 11/1997 | Kennedy | |
| 5,706,097 A | 1/1998 | Schelling et al. | |
| 5,717,841 A | 2/1998 | Farrell et al. | |
| 5,721,883 A * | 2/1998 | Katsuo et al. | 345/505 |
| 5,729,665 A | 3/1998 | Gauthier | |
| 5,749,735 A | 5/1998 | Redford et al. | |
| 5,757,897 A | 5/1998 | LaBarbera et al. | |
| 5,761,380 A | 6/1998 | Lewis et al. | |
| 5,764,235 A | 6/1998 | Hunt et al. | |
| 5,764,368 A | 6/1998 | Shibaki et al. | |
| 5,774,260 A | 6/1998 | Petitto et al. | |
| 5,793,869 A | 8/1998 | Claflin, Jr. | |
| 5,804,803 A | 9/1998 | Cragun et al. | |
| 5,845,144 A * | 12/1998 | Tateyama et al. | 712/1 |
| 5,877,764 A | 3/1999 | Feitelson et al. | |
| 5,884,056 A | 3/1999 | Steele | |
| 5,903,538 A | 5/1999 | Fujita et al. | |
| 5,936,542 A | 8/1999 | Kleinrock et al. | |
| 5,938,727 A | 8/1999 | Ikeda | |
| 5,940,776 A | 8/1999 | Baron et al. | |
| 5,941,936 A | 8/1999 | Taylor | |
| 5,945,998 A | 8/1999 | Eick | |
| 5,949,879 A | 9/1999 | Berson et al. | |
| 5,962,839 A | 10/1999 | Eskildsen | |
| 5,987,226 A | 11/1999 | Ishikawa et al. | |
| 5,999,173 A | 12/1999 | Ubillos | |
| 6,000,030 A | 12/1999 | Steinberg et al. | |
| 6,006,241 A | 12/1999 | Purnaveja et al. | |
| 6,038,567 A | 3/2000 | Young | |
| 6,043,904 A | 3/2000 | Nickerson | |
| 6,046,718 A | 4/2000 | Suzuki et al. | |
| 6,076,733 A | 6/2000 | Wilz, Sr. et al. | |
| 6,076,734 A | 6/2000 | Dougherty et al. | |
| 6,081,261 A | 6/2000 | Wolff et al. | |
| 6,098,106 A | 8/2000 | Philyaw et al. | |
| 6,106,457 A | 8/2000 | Perkins et al. | |
| 6,108,656 A | 8/2000 | Durst et al. | |
| 6,111,567 A | 8/2000 | Savchenko et al. | |
| 6,115,718 A | 9/2000 | Huberman et al. | |
| 6,118,888 A * | 9/2000 | Chino et al. | 382/118 |
| 6,123,258 A | 9/2000 | Iida | |
| 6,125,229 A | 9/2000 | Dimitrova et al. | |
| 6,138,151 A | 10/2000 | Reber et al. | |
| 6,141,001 A | 10/2000 | Baleh | |
| 6,148,094 A | 11/2000 | Kinsella | |
| 6,152,369 A | 11/2000 | Wilz, Sr. et al. | |
| 6,153,667 A | 11/2000 | Howald | |
| 6,167,033 A | 12/2000 | Chang et al. | |
| 6,170,007 B1 | 1/2001 | Venkatraman et al. | |
| 6,175,489 B1 | 1/2001 | Markow et al. | |
| 6,189,009 B1 | 2/2001 | Stratigos et al. | |
| 6,193,658 B1 | 2/2001 | Wendelken et al. | |
| 6,195,068 B1 | 2/2001 | Suzuki et al. | |
| 6,199,042 B1 | 3/2001 | Kurzweil | |
| 6,256,638 B1 | 7/2001 | Dougherty et al. | |
| 6,266,053 B1 | 7/2001 | French et al. | |
| 6,296,693 B1 | 10/2001 | McCarthy | |
| 6,297,812 B1 | 10/2001 | Ohara et al. | |
| 6,297,851 B1 | 10/2001 | Taubman et al. | |
| 6,298,145 B1 | 10/2001 | Zhang et al. | |
| 6,301,586 B1 | 10/2001 | Yang et al. | |
| 6,302,527 B1 | 10/2001 | Walker | |
| 6,307,956 B1 | 10/2001 | Black | |
| 6,308,887 B1 * | 10/2001 | Korman et al. | 235/379 |
| 6,330,976 B1 | 12/2001 | Dymetman et al. | |
| 6,360,057 B1 | 3/2002 | Tsumagari et al. | |
| 6,369,811 B1 | 4/2002 | Graham et al. | |
| 6,373,498 B1 | 4/2002 | Abgrall | |
| 6,373,585 B1 | 4/2002 | Mastie et al. | |
| 6,375,298 B2 | 4/2002 | Purcell et al. | |
| 6,378,070 B1 | 4/2002 | Chan et al. | |
| 6,381,614 B1 | 4/2002 | Barnett et al. | |
| 6,396,594 B1 | 5/2002 | French et al. | |
| 6,400,996 B1 | 6/2002 | Hoffberg et al. | |
| 6,417,435 B2 | 7/2002 | Chantzis et al. | |
| 6,421,738 B1 | 7/2002 | Ratan et al. | |
| 6,439,465 B1 | 8/2002 | Bloomberg | |
| 6,442,336 B1 | 8/2002 | Lemelson | |
| 6,452,615 B1 | 9/2002 | Chiu et al. | |
| 6,466,534 B2 | 10/2002 | Cundiff, Sr. | |
| 6,476,793 B1 | 11/2002 | Motoyama et al. | |
| 6,476,834 B1 | 11/2002 | Doval et al. | |
| 6,502,114 B1 | 12/2002 | Forcier | |
| D468,277 S | 1/2003 | Sugiyama | |
| 6,502,756 B1 | 1/2003 | Fåhraeus | |
| 6,504,620 B1 | 1/2003 | Kinjo | |
| 6,515,756 B1 | 2/2003 | Mastie et al. | |
| 6,519,360 B1 | 2/2003 | Tanaka | |
| 6,529,920 B1 | 3/2003 | Arons et al. | |
| 6,535,639 B1 | 3/2003 | Uchihachi et al. | |
| 6,544,294 B1 | 4/2003 | Greenfield et al. | |
| 6,552,743 B1 | 4/2003 | Rissman | |

| | | |
|---|---|---|
| 6,556,241 B1 | 4/2003 | Yoshimura et al. |
| 6,568,595 B1 | 5/2003 | Russell et al. |
| 6,581,070 B1 | 6/2003 | Gibbon et al. |
| 6,587,859 B2 | 7/2003 | Dougherty et al. |
| 6,594,377 B1 | 7/2003 | Kim et al. |
| 6,611,276 B1 | 8/2003 | Muratori et al. |
| 6,611,622 B1 * | 8/2003 | Krumm ............... 382/170 |
| 6,611,628 B1 | 8/2003 | Sekiguchi et al. |
| 6,625,334 B1 | 9/2003 | Shiota et al. |
| 6,647,534 B1 | 11/2003 | Graham |
| 6,647,535 B1 | 11/2003 | Bozdagi et al. |
| 6,654,887 B2 | 11/2003 | Rhoads |
| 6,665,092 B2 | 12/2003 | Reed |
| 6,674,538 B2 | 1/2004 | Takahashi |
| 6,678,389 B1 | 1/2004 | Sun et al. |
| 6,687,383 B1 | 2/2004 | Kanevsky et al. |
| 6,700,566 B2 | 3/2004 | Shimoosawa et al. |
| 6,701,369 B1 | 3/2004 | Philyaw |
| 6,724,494 B1 | 4/2004 | Danknick |
| 6,728,466 B1 | 4/2004 | Tanaka |
| 6,745,234 B1 | 6/2004 | Philyaw et al. |
| 6,750,978 B1 | 6/2004 | Marggraff et al. |
| 6,753,883 B2 | 6/2004 | Schena et al. |
| 6,771,283 B2 | 8/2004 | Carro |
| 6,772,947 B2 | 8/2004 | Shaw |
| 6,774,951 B2 | 8/2004 | Narushima |
| 6,775,651 B1 | 8/2004 | Lewis et al. |
| 6,807,303 B1 | 10/2004 | Kim et al. |
| 6,824,044 B1 | 11/2004 | Lapstun et al. |
| 6,845,913 B2 | 1/2005 | Madding et al. |
| 6,853,980 B1 | 2/2005 | Ying et al. |
| 6,856,415 B1 | 2/2005 | Simchik et al. |
| 6,871,780 B2 | 3/2005 | Nygren et al. |
| 6,877,134 B1 | 4/2005 | Fuller et al. |
| 6,883,162 B2 | 4/2005 | Jackson et al. |
| 6,886,750 B2 | 5/2005 | Rathus et al. |
| 6,892,193 B2 | 5/2005 | Bolle et al. |
| 6,898,709 B1 | 5/2005 | Teppler |
| 6,904,168 B1 | 6/2005 | Steinberg et al. |
| 6,904,451 B1 | 6/2005 | Orfitelli et al. |
| 6,923,721 B2 | 8/2005 | Luciano et al. |
| 6,931,594 B1 | 8/2005 | Jun |
| 6,938,202 B1 | 8/2005 | Matsubayashi et al. |
| 6,946,672 B1 | 9/2005 | Lapstun et al. |
| 6,950,623 B2 | 9/2005 | Brown et al. |
| 6,964,374 B1 | 11/2005 | Djuknic et al. |
| 6,966,495 B2 | 11/2005 | Lynggaard et al. |
| 6,983,482 B2 | 1/2006 | Morita et al. |
| 7,000,193 B1 | 2/2006 | Impink, Jr. et al. |
| 7,023,459 B2 | 4/2006 | Arndt et al. |
| 7,031,965 B1 | 4/2006 | Moriya et al. |
| 7,073,119 B2 | 7/2006 | Matsubayashi et al. |
| 7,075,676 B2 | 7/2006 | Owen |
| 7,089,420 B1 | 8/2006 | Durst et al. |
| 7,092,568 B2 | 8/2006 | Eaton |
| 7,131,058 B1 | 10/2006 | Lapstun et al. |
| 7,134,016 B1 | 11/2006 | Harris |
| 7,149,957 B2 | 12/2006 | Hull et al. |
| 7,151,613 B1 | 12/2006 | Ito |
| 7,152,206 B1 | 12/2006 | Tsuruta |
| 7,162,690 B2 | 1/2007 | Gupta et al. |
| 7,174,151 B2 | 2/2007 | Lynch et al. |
| 7,181,502 B2 | 2/2007 | Incertis |
| 7,196,808 B2 | 3/2007 | Kofman et al. |
| 7,215,436 B2 | 5/2007 | Hull et al. |
| 7,225,158 B2 | 5/2007 | Toshikage et al. |
| 7,228,492 B1 | 6/2007 | Graham |
| 7,260,828 B2 | 8/2007 | Aratani et al. |
| 7,263,659 B2 | 8/2007 | Hull et al. |
| 7,263,671 B2 | 8/2007 | Hull et al. |
| 7,280,738 B2 | 10/2007 | Kauffman et al. |
| 7,298,512 B2 * | 11/2007 | Reese et al. ............... 358/1.15 |
| 7,305,620 B1 | 12/2007 | Nakajima et al. |
| 7,313,808 B1 | 12/2007 | Gupta et al. |
| 7,363,580 B2 | 4/2008 | Tabata et al. |
| 7,647,555 B1 | 1/2010 | Wilcox et al. |
| 2001/0003846 A1 | 6/2001 | Rowe et al. |
| 2001/0017714 A1 | 8/2001 | Komatsu et al. |
| 2001/0037408 A1 | 11/2001 | Thrift et al. |
| 2001/0052942 A1 | 12/2001 | MacCollum et al. |
| 2002/0001101 A1 | 1/2002 | Hamura et al. |
| 2002/0004807 A1 | 1/2002 | Graham et al. |
| 2002/0006100 A1 | 1/2002 | Cundiff, Sr. et al. |
| 2002/0010641 A1 | 1/2002 | Stevens et al. |
| 2002/0011518 A1 | 1/2002 | Goetz et al. |
| 2002/0015066 A1 | 2/2002 | Siwinski et al. |
| 2002/0019982 A1 | 2/2002 | Aratani et al. |
| 2002/0023957 A1 | 2/2002 | Michaelis et al. |
| 2002/0048224 A1 | 4/2002 | Dygert et al. |
| 2002/0051010 A1 | 5/2002 | Jun et al. |
| 2002/0060748 A1 | 5/2002 | Aratani et al. |
| 2002/0066782 A1 | 6/2002 | Swaminathan et al. |
| 2002/0067503 A1 | 6/2002 | Hiatt |
| 2002/0078149 A1 | 6/2002 | Chang et al. |
| 2002/0087530 A1 | 7/2002 | Smith et al. |
| 2002/0087598 A1 | 7/2002 | Carro |
| 2002/0099534 A1 | 7/2002 | Hegarty |
| 2002/0101343 A1 | 8/2002 | Patton |
| 2002/0101513 A1 | 8/2002 | Halverson |
| 2002/0131071 A1 | 9/2002 | Parry |
| 2002/0131078 A1 | 9/2002 | Tsukinokizawa |
| 2002/0134699 A1 | 9/2002 | Bradfield et al. |
| 2002/0135800 A1 | 9/2002 | Dutta |
| 2002/0140993 A1 | 10/2002 | Silverbrook |
| 2002/0159637 A1 | 10/2002 | Echigo et al. |
| 2002/0165769 A1 | 11/2002 | Ogaki et al. |
| 2002/0169849 A1 | 11/2002 | Schroath |
| 2002/0171857 A1 | 11/2002 | Hisatomi et al. |
| 2002/0185533 A1 | 12/2002 | Shieh et al. |
| 2002/0199149 A1 | 12/2002 | Nagasaki et al. |
| 2003/0002068 A1 | 1/2003 | Constantin et al. |
| 2003/0007776 A1 | 1/2003 | Kameyama et al. |
| 2003/0014615 A1 | 1/2003 | Lynggaard |
| 2003/0024975 A1 | 2/2003 | Rajasekharan |
| 2003/0025951 A1 | 2/2003 | Pollard et al. |
| 2003/0038971 A1 | 2/2003 | Renda |
| 2003/0046241 A1 | 3/2003 | Toshikage et al. |
| 2003/0051214 A1 | 3/2003 | Graham et al. |
| 2003/0065925 A1 | 4/2003 | Shindo et al. |
| 2003/0076521 A1 | 4/2003 | Li et al. |
| 2003/0088582 A1 | 5/2003 | Pflug |
| 2003/0093384 A1 | 5/2003 | Durst et al. |
| 2003/0110926 A1 | 6/2003 | Sitrick et al. |
| 2003/0117652 A1 | 6/2003 | Lapstun |
| 2003/0121006 A1 | 6/2003 | Tabata et al. |
| 2003/0146927 A1 | 8/2003 | Crow et al. |
| 2003/0160898 A1 | 8/2003 | Baek et al. |
| 2003/0164898 A1 | 9/2003 | Imai |
| 2003/0177240 A1 | 9/2003 | Gulko et al. |
| 2003/0187642 A1 | 10/2003 | Ponceleon et al. |
| 2003/0218597 A1 | 11/2003 | Hodzic |
| 2003/0220988 A1 * | 11/2003 | Hymel ............... 709/220 |
| 2003/0231198 A1 | 12/2003 | Janevski |
| 2004/0044894 A1 | 3/2004 | Lofgren et al. |
| 2004/0049681 A1 | 3/2004 | Diehl et al. |
| 2004/0064207 A1 * | 4/2004 | Zacks et al. ............... 700/91 |
| 2004/0118908 A1 | 6/2004 | Ando et al. |
| 2004/0125402 A1 | 7/2004 | Kanai et al. |
| 2004/0128514 A1 | 7/2004 | Rhoads |
| 2004/0128613 A1 | 7/2004 | Sinisi |
| 2004/0143459 A1 | 7/2004 | Engelson et al. |
| 2004/0143602 A1 | 7/2004 | Ruiz et al. |
| 2004/0150627 A1 | 8/2004 | Luman et al. |
| 2004/0156616 A1 | 8/2004 | Strub et al. |
| 2004/0167895 A1 | 8/2004 | Carro |
| 2004/0229195 A1 | 11/2004 | Marggraff et al. |

| | | | |
|---|---|---|---|
| 2004/0240541 A1 | 12/2004 | Chadwick et al. | |
| 2004/0240562 A1 | 12/2004 | Bargeron et al. | |
| 2004/0249650 A1 | 12/2004 | Freedman et al. | |
| 2005/0038794 A1 | 2/2005 | Piersol | |
| 2005/0064935 A1 | 3/2005 | Blanco | |
| 2005/0083413 A1 | 4/2005 | Reed et al. | |
| 2005/0149849 A1 | 7/2005 | Graham et al. | |
| 2005/0213153 A1 | 9/2005 | Hull et al. | |
| 2005/0216838 A1 | 9/2005 | Graham | |
| 2005/0216852 A1 | 9/2005 | Hull et al. | |
| 2005/0225781 A1 | 10/2005 | Koizumi | |
| 2005/0262437 A1 | 11/2005 | Patterson et al. | |
| 2006/0013478 A1 | 1/2006 | Ito et al. | |
| 2006/0043193 A1 | 3/2006 | Brock | |
| 2006/0092450 A1 | 5/2006 | Kanazawa et al. | |
| 2006/0136343 A1 | 6/2006 | Coley et al. | |
| 2006/0171559 A1 | 8/2006 | Rhoads | |
| 2006/0250585 A1 | 11/2006 | Anderson et al. | |
| 2007/0033419 A1 | 2/2007 | Kocher et al. | |
| 2007/0109397 A1 | 5/2007 | Yuan et al. | |
| 2007/0162858 A1 | 7/2007 | Hurley et al. | |
| 2007/0168426 A1 | 7/2007 | Ludwig et al. | |
| 2007/0234196 A1 | 10/2007 | Nicol et al. | |
| 2008/0246757 A1 | 10/2008 | Ito | |

FOREIGN PATENT DOCUMENTS

| | | |
|---|---|---|
| CN | 1352765 A | 6/2002 |
| CN | 1097394 C | 12/2002 |
| EP | 0651556 | 5/1995 |
| EP | 0743613 | 11/1996 |
| EP | 1079313 A2 | 2/2001 |
| EP | 1133170 A2 | 9/2001 |
| JP | 60-046653 | 3/1985 |
| JP | 04-225670 | 8/1992 |
| JP | 05-101484 | 4/1993 |
| JP | 06-124502 | 5/1994 |
| JP | H07-284033 | 10/1995 |
| JP | 08-69419 | 3/1996 |
| JP | H09-037180 | 2/1997 |
| JP | H10-049761 | 2/1998 |
| JP | 10-126723 | 5/1998 |
| JP | H11-341423 | 12/1999 |
| JP | 2001-228994 | 8/2001 |
| JP | 2003-87458 | 3/2003 |
| JP | 2003-513564 | 4/2003 |
| JP | 2003-514318 | 4/2003 |
| WO | WO9806098 | 2/1998 |
| WO | WO 99/18523 | 4/1999 |
| WO | WO0073875 | 12/2000 |
| WO | WO 02/082316 A1 | 10/2002 |

OTHER PUBLICATIONS

Configuring A Printer (NT), Oxford Computer Support [online] [Retrieved on Nov. 13, 2003] Retrieved from the Internet<URL: http://www.nox.ac.uk/cehoxford/ccs/facilities/printers/confignt.htm>.
"DocumentMall Secure Document Management" [online] (Retrieved on Mar. 9, 2004). Retrieved from the Internet <URL: http://www.documentmall.com>.
Girgensohn, Andreas et al., "Time-Constrained Keyframe Selection Technique," Multimedia Tools and Applications (2000), vol. 11, pp. 347-358.
Graham, Jamey et al., "A Paper-Based Interface for Video Browsing and Retrieval," IEEE International Conference on Multimedia and Expo (Jul. 6-9, 2003), vol. 2, p. II 749-752.
Graham, Jamey et al., "The Video Paper Multimedia Playback System," Proceedings of the 11th ACM International Conference on Multimedia (Nov. 2003), pp. 94-95.
Graham, Jamey et al., "Video Paper: A Paper-Based Interface for Skimming and Watching Video," International Conference on Consumer Electronics (Jun. 16-18, 2002), pp. 214-215.
Hull, Jonathan J. et al., "Visualizing Multimedia Content on Paper Documents: Components of Key Frame Selection for Video Paper," Proceedings of the 7th International Conference on Document Analysis and Recognition (2003), vol. 1, pp. 389-392.
"Kofax: Ascent Capture: Overview" [online] [Retrieved on Jan. 22, 2004]. Retrieved form the Internet: <URL http://www.kofax.com/products/ascent/capture>.
Label Producer by Maxell, [online] [Retrieved on Nov. 11, 2003]. Retrieved from the Internet<URL: http://www.maxell.co.jp/products/consumer/rabel_card/>.
Movie-PhotoPrint by Canon, [online] [Retrieved on Nov. 11, 2003]. Retrieved from the Internet<URL: http://cweb.canon.jp/hps/guide/rimless.html>.
PostScript Language Document Structuring Conventions Specification, Version 3.0 (Sep. 25, 1992), Adobe Systems Incorporated.
Print From Cellular Phone by Canon, [online] [Retrieved on Nov. 11, 2003]. Retrieved from the Internet<URL: http://cweb.canon.jp/bj/enjoy/pbeam/index.html>.
Print Images Plus Barcode by Fuji Xerox, [online] [Retrieved on Nov. 11, 2003]. Retrieved from the Internet<URL: http://www.fujixerox.co.jp/soft/cardgear/release.html>.
Print Scan-Talk by Barcode by Epson, [online] [Retrieved on Nov. 11, 2003]. Retrieved from the Internet<URL: http://www.epson.co.jp/osirase/2000/000217.htm>.
Printer With CD/DVD Tray, Print CD/DVD Label by Epson, [online] [Retrieved on Nov. 11, 2003]. Retrieved from the Internet<URL: http://www.i-love-epson.co.jp/products/printer/inkjet/pmd750/pmd7503.htm>.
R200 ScanTalk [online] (date unknown). Retrieved from the Internet<URL: http://homepage2.nifty.com/vasolza/ScanTalk.htm>.
Variety of Media In, Print Paper Out by Epson, [online] [Retrieved on Nov. 11, 2003]. Retrieved from the Internet<URL: http://www.i-love-epson.co.jp/products/spc/pma850/pma8503.htm>.
Gopal, S. et al., "Load Balancing in a Heterogeneous Computing Environment," Proceedings of the Thirty-First Hawaii International Conference on System Sciences, Jan. 6-9, 1998.
Gropp, W. et al., "Using MPI—Portable Programming with the Message-Passing Interface," copyright 1999, pp. 35-42, second edition, MIT Press.
"Seiko Instruments USA, Inc.—Business and Home Office Products" online, date unknown, Seiko Instruments USA, Inc., [retrieved on Jan. 25, 2005]. Retrieved from the Internet: <URL: http://www.siibusinessproducts.com/products/link-ir-p-html>.
"Tasty FotoArt" [online], date unknown, Tague Technologies, Inc., [retrieved on Mar. 8, 3005]. Retrieved from the Internet <URL: http//www.tastyfotoart.com>.
Gropp, W. et al., "Using MPI-Portable Programming with the Message Passing Interface," copyright 1999, pp. 35-42, second edition, MIT Press.
Poon, K.M. et al., "Performance Analysis of Median Filtering on Meiko™—A Distributed Multiprocessor System," IEEE First International Conference on Algorithms and Architectures for Parallel Processing, 1995, pp. 631-639.
Dimitrova, N. et al., "Applications of Video-Content Analysis and Retrieval," IEEE Multimedia, Jul.-Sep. 2002, pp. 42-55.
European Search Report, EP 04255836, Sep. 12, 2006, 4 pages.
European Search Report, EP 04255837, Sep. 5, 2006, 3 pages.
European Search Report, EP 04255839, Sep. 4, 2006, 3 pages.
European Search Report, EP 04255840, Sep. 12, 2006, 3 pages.
Graham, J. et al., "A Paper-Based Interface for Video Browsing and Retrieval," ICME '03, Jul. 6-9, 2003, pp. 749-752, vol. 2.
Graham, J. et al., "Video Paper: A Paper-Based Interface for Skimming and Watching Video," ICCE '02, Jun. 18-20, 2002, pp. 214-215.
Klemmer, S.R. et al., "Books With Voices: Paper Transcripts as a Tangible Interface to Oral Histories," CHI Letters, Apr. 5-10, 2003, pp. 89-96, vol. 5, Issue 1.
Minami, K. et al., "Video Handling with Music and Speech Detection," IEEE Multimedia, Jul.-Sep. 1998, pp. 17-25.
Shahraray, B. et al, "Automated Authoring of Hypermedia Documents of Video Programs," ACM Multimedia '95 Electronic Proceedings, San Francisco, CA, Nov. 5-9, 1995, pp. 1-12.
Multimedia '95 Electronic Proceedings, San Francisco, CA, Nov. 5-9, 1995, pp. 1-12.

Shahraray, B. et al., "Pictorial Transcripts; Multimedia Processing Applied to Digital Library Creation," IEEE, 1997, pp. 581-586.

ASCII 24.com, [online] (date unknown), Retrieved from the Internet<URL: http://216.239.37.104/search?q=cache:z-G9M1EpvSUJ:ascii24.com/news/i/hard/article/1998/10/01/612952-000.html+%E3%82%B9%E3%...>.

Label Producer by Maxell, [online] [Retrieved on Nov. 11, 2003]. Retrieved from the Internet<URL: http://www.maxell.co.jp/products/consumer/rabel_card/>.

Movie-PhotoPrint by Canon, [online] [Retrieved on Nov. 11, 2003]. Retrieved from the Internet<URL: http://cweb.canon.jp/hps/guide/rimless.html>.

Print From Cellular Phone by Canon, [online] [Retrieved on Nov. 11, 2003]. Retrieved from the Internet<URL: http://cweb.canon.jp/bj/enjoy/pbeam/index.html>.

Print Images Plus Barcode by Fuji Xerox, [online] [Retrieved on Nov. 11, 2003]. Retrieved from the Internet<URL: http://www.fujixerox.co.jp/soft/cardgear/release.html>.

Print Scan-Talk by Barcode by Epson, [online] [Retrieved on Nov. 11, 2003]. Retrieved from the Internet<URL: http://www.epson.co.jp/osirase/2000/000217.htm>.

Printer With CD/DVD Tray, Print CD/DVD Label by Epson, [online] [Retrieved on Nov. 11, 2003]. Retrieved from the Internet<URL: http://www.i-love-epson.co.jp/products/printer/inkjet/pmd750/pmd7503.htm>.

R200 Scan Talk [online] (date unknown). Retrieved from the Internet<URL: http://homepage2.nifty.com/vasolza/ScanTalk.htm>.

Variety of Media In, Print Paper Out by Epson, [online] [Retrieved on Nov. 11, 2003]. Retrieved from the Internet<URL: http://www.i-love-epson.co.jp/products/spc/pma850/pma8503.htm>.

Communication Pursuant to Article 96(2) EPC, European Application No. 04255836.1, Jun. 11, 2007, 10 pages.

Stifelman, L. et al., "The Audio Notebook," SIGCHI 2001, Mar. 31-Apr. 5, 2001, pp. 182-189, vol. 3, No. 1, Seattle, WA.

Chinese Application No. 2004100849823 Office Action, Jun. 1, 2007, 24 pages.

Chinese Application No. 2004100897988 Office Action, Apr. 6, 2007, 8 pages.

Hardman, L. et al, "Integrating the Amsterdam Hypermedia Model with the Standard Reference Model for Intelligent Multimedia Presentation Systems," Computer Standards & Interfaces, 1997, pp. 497-507, vol. 18.

Lauesen, S., "User Interface Design: A Software Engineering Perspective," 2005, 28 pages, Pearson Education Limited.

Groot, M., "Multimedia Projectors: A Key Component in the Classroom of the Future," T.H.E. Journal Online, Jun. 2002, pp. 1-4, [Online] [Retrieved on Jul. 1, 2002] Retrieved from the Internet<URL:http://www.thejournal.com/magazine/vault/A4056.cfm>.

Shelbourn, M., et al., "Multimedia in Construction Education: New Dimensions," Automation in Construction, 2001, pp. 265-274, vol. 10, Elsevier.

Japanese Office Action, Japanese Application No. 2004-278353, Aug. 11, 2009, 3 pages.

Ueno, M. et al., "Multimedia Information EPG and its Use: A Proposal of Multimedia EPG", Proceedings of the Institute of Electronics, Information and Communication Engineers (IEICE) General Conference, Basic/Boundary, Mar. 6, 1998, pp. 357 (7 pages including translation).

United States Office Action, U.S. Appl. No. 11/094,887, Dec. 30, 2009, 22 pages.

Machine Translation of JP 10049761 by Mori et al., 9 pages.

Mulhern, P. et al., "Pivot Vector Space Approach for Audio-Video Mixing," IEEE Multimedia, Apr.-Jun. 2003, pp. 28-40, vol. 10, Issue 2.

Srinivasan, U. et al., "Multi-Modal Feature-Map: An Approach to Represent Digital Video Sequences," VISUAL '99, LNCS 1614, 1999, pp. 299-306, Springer-Verlag, Berlin, Germany.

United States Office Action, U.S. Appl. No. 10/814,844, Sep. 11, 2009, 23 pages.

Japanese Office Action, Japanese Application No. 2004-278346, Feb. 16, 2010, 2 pages.

Japanese Office Action, Japanese Application No. 2004-278349, Feb. 2, 2010, 2 pages.

Tonomura, Y. et al., "Structured Video Computing," IEEE Multimedia, Sep. 1994, pp. 34-43, vol. 1, Issue 3.

European Search Report, Application No. EP 04255847.8-1247/1526442, 4 pages.

United States Office Action, U.S. Appl. No. 11/094,887, Jul. 21, 2010, 44 pages.

Arai, T. et al., "PaperLink: A Technique for Hyperlinking from Real Paper to Electronic Content," CHI 97, Atlanta, GA, Mar. 22-27, 1997, pp. 327-334.

Dorai, C. et al., "End-to-End VideoText Recognition for Multimedia Content Analysis," IEEE, International Conference on Multimedia and Expo, Aug. 2001, pp. 601-604.

Hecht, D.L., "Printed Embedded Data Graphical User Interfaces," Computer, Mar. 2001, pp. 47-55, vol. 34, Issue 3.

Klemmer, S.R. et al., "Books with Voices: Paper Transcripts as a Tangible Interface to Oral Histories," CHI 2003, Fort Lauderdale, FL, Apr. 5-10, 2003, pp. 89-96.

Boreczky, J. et al., "An Interactive Comic Book Presentation for Exploring Video," CHI Letters, Apr. 1-6, 2000, pp. 185-192, vol. 2, Issue 1.

Buchanan, M.C. et al., "Multimedia Documents as User Interfaces," INTERCHI '93, Amsterdam, The Netherlands, Apr. 24-29, 1993, pp. 527-528.

Harada, K. et al., "Anecdote: A Multimedia Storyboarding System with Seamless Authoring Support," ACM Multimedia '96, Boston, MA, 1996, pp. 341-351.

Mackay, W. et al., "Augmenting Reality: Adding Computational Dimensions to Paper" Communications of the ACM, Jul. 1993, pp. 96-97, vol. 36, No. 7.

MacKay, W. et al., "Video Mosaic: Laying Out Time in a Physical Space," Multimedia '94, San Francisco, CA, Oct. 1994, pp. 165-172.

Makedon, F. et al., "Multimedia Authoring, Development Environments and Digital Video Editing," Dartmouth College Technical Report, PCS-TR94-231, 2001, pp. 1-24.

Nelson, L. et al, "Palette: A Paper Interface for Giving Presentations," CHI '99, May 1999, pp. 1-8.

Roschelle, J. et al., "VideoNoter: A Productivity Tool for Video Data Analysis," Behavior Research Methods, Instruments & Computers, 1991, pp. 219-224, vol. 23, No. 2.

Tonomura, Y. et al., "VideMAP and VideoSpaceIcon," INTERCHI '93, Amsterdam, The Netherlands, Apr. 24-29, 1993, pp. 131-136 and 544.

Wellner, P., "Interacting with Paper on the DigitalDesk," Communications of the ACM, Jul. 1993, pp. 87-96, vol. 36, No. 7.

* cited by examiner

PRINTER WITH MULTIMEDIA SERVER

CROSS-REFERENCE TO RELATED APPLICATIONS

This application claims the benefit of the following provisional patent applications, each of which is incorporated by reference in its entirety: U.S. Provisional Application No. 60/506,206, filed Sep. 25, 2003 entitled "Printer Driver, Interface and Method for Selecting and Printing Representations of Audio, Video or Processed Information;" U.S. Provisional Application No. 60/506,263, filed Sep. 25, 2003 entitled "Systems and Methods for Printing Audio or Video Paper;" U.S. Provisional Application No. 60/506,302, filed Sep. 25, 2003 entitled "Printer Including Interface and Specialized Information Processing Capabilities;" U.S. Provisional Application No. 60/506,303, filed Sep. 25, 2003 entitled "Printer Including One or More Specialized Hardware Devices;" and U.S. Provisional Application No. 60/506,411, filed Sep. 25, 2003 entitled "Printer for Non-Paper and Multiple Media Types."

This application is also related to the following co-pending patent applications, each of which is incorporated by reference: U.S. patent application entitled, "Printer Having Embedded Functionality for Printing Time-Based Media," filed Mar. 30, 2004, and U.S. patent application entitled, "Networked Printing System Having Embedded Functionality for Printing Time-Based Media," filed Mar. 30, 2004. This application is also related to the following co-pending patent applications (hereafter the "Media Content Processing Applications"), each of which is incorporated by reference U.S. patent application entitled, "Printer with Audio/Video Localization," filed Mar. 30, 2004, U.S. patent application entitled, "Music Processing Printer," filed Mar. 30, 2004, U.S. patent application entitled, "Printing System With Embedded Audio/Video Content Recognition and Processing," filed Mar. 30, 2004.

This application further incorporates by reference in their entirety the following co-pending patent applications (hereinafter, "the Video Paper patent applications"): U.S. patent application entitled, "Printable Representations for Time-based Media," filed Mar. 30, 2004, U.S. application Ser. No. 10/001,895, filed Nov. 19, 2001; U.S. application Ser. No. 10/001,849, filed Nov. 19, 2001; U.S. application Ser. No. 10/001,893, filed Nov. 19, 2001; U.S. application Ser. No. 10/001,894, filed Nov. 19, 2001; U.S. application Ser. No. 10/001,891, filed Nov. 19, 2001; U.S. application Ser. No. 10/175,540, filed Jun. 18, 2002; and U.S. application Ser. No. 10/645,821, filed Aug. 20, 2003.

FIELD OF INVENTION

The invention generally relates to printers that have embedded functionality for printing multimedia data.

BACKGROUND

A printer in a computer system typically is seen as handling the mechanics of physically outputting information on a medium, typically paper. The printer is somewhat of a passive participant in the computer system. Printers handle a bit of higher level control for controlling printing such as keeping a queue of documents to be printed, indicating the toner is low, or providing an out-of-paper message. Printers do not typically provide any assistance with processing actual content for printing on an output medium.

Knowledge workers are now making increasing use of multimedia data, particularly in reports and presentations. The multimedia data typically includes time based data sometimes also referred to as time based media, examples of which include audio clips, animations, and video clips. A computer, typically a desktop computer or a laptop, connected to the printer via a network interface or a direct connection, has to have the necessary hardware and/or software for modifying the multimedia content for printing, formatting that content for a desired medium, and selecting the desired medium upon which to imprint the content. If users at different computers in a network desire to perform multimedia content processing functions and output to different media, the different computers each have to have the appropriate hardware and/or software. Furthermore, their computers have to handle the computational load required for multimedia content processing and for supporting specific formats for storing and printing multimedia content.

It is desirable to offload at least part of the computational load to an intelligent printer that can perform multimedia content processing, particularly for time-based data, such as editing and content formatting independently from a computer to which it is connected. It is desirable also that the printer provides a variety of output media options. It is also desirable that the printer can provide storage for the various forms of output media for example in a multimedia content database. A printer that can independently maintain a multimedia database provides streamlined storage of the multimedia content.

SUMMARY OF THE INVENTION

In one aspect, the present invention provides a printer with an embedded multimedia server. One embodiment of the printer with an embedded multimedia server comprises a chassis for housing a print engine, a multimedia server, a non-volatile storage device for storing a database of multimedia content, and a user input device accessible on the printer chassis. In this embodiment, the print engine controls printing to a plurality of media storage forms, including removable storage media forms. The print engine is coupled to at least one media holder and is communicatively coupled to the multimedia server. The user interface device is communicatively coupled to the multimedia server. The multimedia server is communicatively coupled to at least one media content interface through which it receives multimedia content from one or more media content sources. This embodiment can further comprise a display accessible on the printer chassis and communicatively coupled to the multimedia server for displaying data under the control of the server.

In one instance, the multimedia server also includes a multimedia database manager which is communicatively coupled to the non-volatile storage medium storing the database. In another instance, there is at least one network interface communicatively coupled to the multimedia server which includes a web server. In another example, the multimedia server further comprises a web browser which displays data on the display accessible on the printer chassis.

In another aspect, the present invention provides a method for processing multimedia content for use in a printer with an embedded multimedia server. One embodiment of such a method in accordance with the present invention comprises performing multimedia content processing, and outputting a content selection based on criteria. Another embodiment of a method in accordance with the present invention further comprises generating an index document for the content selection based on criteria. Another method embodiment further comprises monitoring time based multimedia content based on criteria.

DETAILED DESCRIPTION OF THE PREFERRED EMBODIMENT

Figure 1:
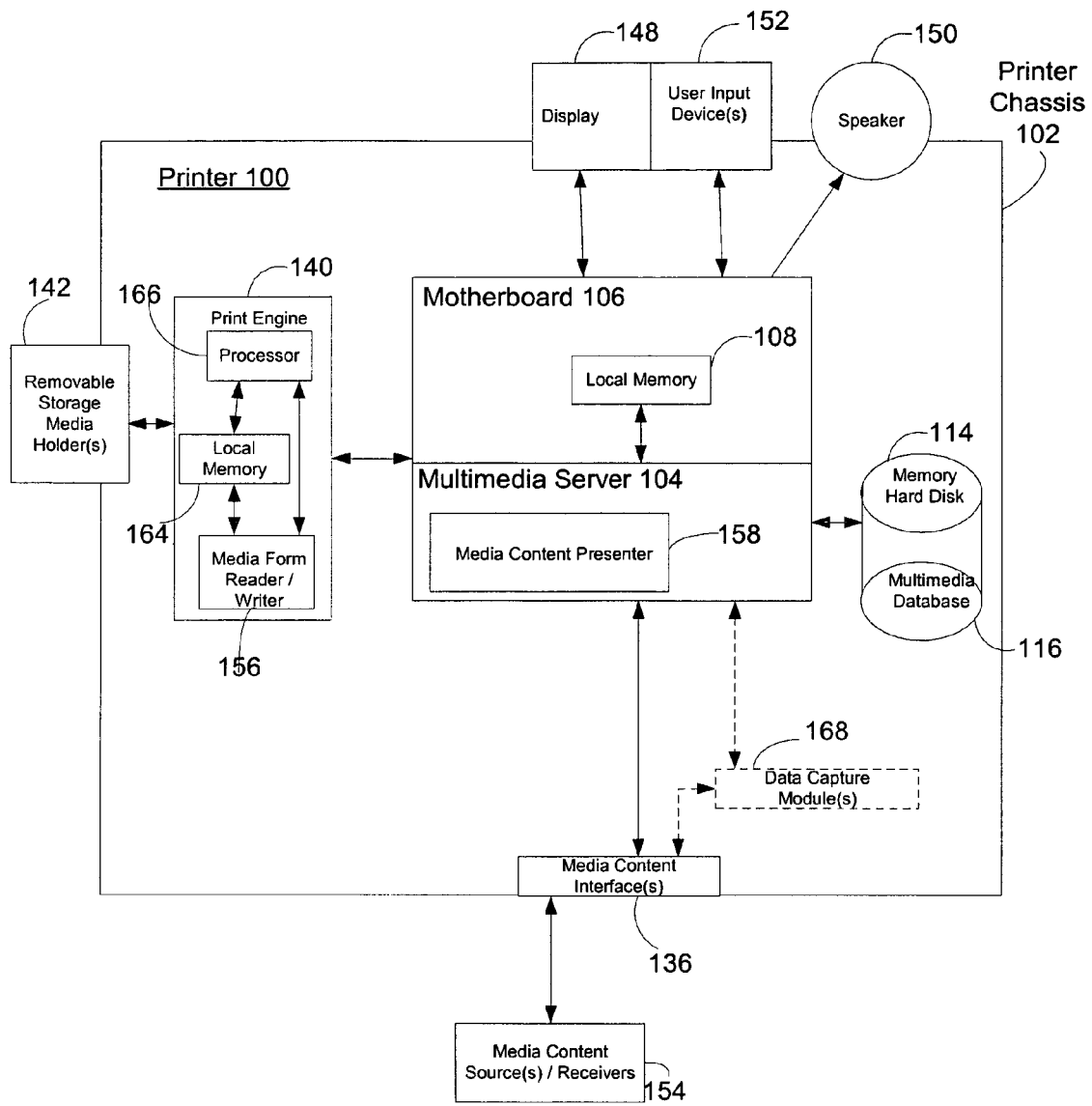
FIG. 1 illustrates a printer with an embedded multimedia server in accordance with an embodiment of the present invention.

FIG. 1 illustrates a printer 100 with an embedded multimedia server 104 in accordance with an embodiment of the present invention. The printer 100 comprises a printer chassis 102 that provides a housing for various components such as a print engine 140, a motherboard 106 comprising a multimedia server 104 and a local memory 108, a non-volatile storage device 114 illustrated in this example as a memory hard disk for storing a database 116 of multimedia content data, at least one user input device 152 accessible on the printer chassis 102, a display 148 accessible on the printer chassis 102, at least one media content interface 136 accessible through the chassis 102, a speaker 150 accessible on the printer chassis 102, and at least one removable storage medium holder 142 that can be detached from the chassis 102.

The print engine 140 is communicatively coupled to the multimedia server 104 on the motherboard 106 in this embodiment. The print engine 140 includes a processor 166, which can be a general purpose computer processor, a local memory 164, and at least one media form reader/writer 156, examples of which include a DVD reader/writer, a CD reader/writer, a SD reader/writer, an audio cassette reader/writer, a videocassette reader/writer, a floppy disk reader/writer, a ZIP disk reader/writer, a flash card reader/writer, a micro-drive reader/writer, and a memory stick reader/writer. Other examples of media forms that may be read or written to are paper, plastic sheets, magnetic strips, or any other suitable type of removable storage media devices. In this embodiment, selected content to be printed is downloaded to the local memory 164 by the multimedia server 104 to the print engine 140. In another embodiment, the multimedia server 104 can be accessed by a media content interface 136 for transferring content data. For example, the media content interface 136 can include a broadband network interface through which an external computing device 154 such as a laptop or personal digital assistant (PDA) receives or sends time-based media data. In this example, the at least one removable storage medium holder 142 is controlled by the print engine 140 for the printing processing. For example, the print engine 140 controls the positioning of a medium for reading and writing. Examples of a removable media holder 142 are a tray or bandolier configured for holding one or more forms of removable storage media.

The display 148 accessible on the printer chassis is communicatively coupled to the multimedia server 104 for displaying data under its control. In another embodiment, the display 148 is also communicatively coupled to the print engine 140 for displaying data under its control as well. The user input device 152 is communicatively coupled to the multimedia server 104 for receiving input which can indicate user preferences and criteria for content based processing. The input device 152 can include one or more of the following examples: a pointing device, buttons, a touch screen, a speech recognition system with a microphone, a keypad, or a keyboard or any other suitable input device. In another example, the device 152 is also communicatively coupled to the print engine 140 to receive user input directed to controlling the printing process such as the number of copies. In another example, the multimedia server 104 can handle all user input.

The multimedia server 104 can be implemented in hardware, software, firmware or a combination of both. Preferably, software associated with multimedia server 104 is executed on a separate processor from the processor 166 within the print engine 140. Again, a general purpose computer processor can be used. The multimedia server 104 performs multimedia content processing, and manages the database 116 of multimedia content. The multimedia server 104 is communicatively coupled to receive content data for different types of media in different formats, particularly time-based multimedia content data, from media content sources 154 via at least one media content interface 136. Additionally, the multimedia server 104 can send content data for different types of media in different formats, particularly time-based multimedia content data, to media content recipients 154 via at least one media content interface 136. Preferably, the media content interface 136 includes a broadband network interface. One example of multimedia content processing that the server 104 can perform is receiving content data in one format, and converting it to another format for output on a removable storage medium, storage in another form in the database 116, or for relaying over a media content interface 136, for example, a network interface to another storage location. For example, if the printer 100 receives information from a Bluetooth device, like an Anoto pen, the server 104 saves the data in a portable document format (PDF) in the database 116 or relays it as a PDF over a network interface 136 to another storage location for downloading later on the user's home computer. Such a relay function could be very useful for Bluetooth video cameras, cell phones with cameras that also have Bluetooth interfaces, and any other Bluetooth-enabled device. Relaying of data can be done for a batch re-transmission of stored recorded data, as controlled by a touch panel interface 152 on the printer, or for a live re-transmission as data is being recorded.

In the illustrated embodiment, the multimedia server 104 comprises a media content presenter 158, examples of which include software capable of displaying fixed content such as text, a photo, or a diagram on the display 148, software and/or hardware for playing video data on the display 148 or software and/or hardware for playing audio data through the speaker 150.

The media content interface 136 can be designed to accommodate various formats for multimedia data including time-based data. Because of the great variety of types and formats of media data, the media content interface 136 may take any number of forms. The following are some illustrative examples of different media content interfaces 136. In particular implementations, the printer 100 may have only one or only a subset of these types of interfaces. One example is a network interface for receiving data over a network, for example a computer network (e.g., internal company network or the Internet, or a computer connection relaying data originating from other content capture sources such as cellular telephones, a TV receiver, or a satellite, or a GPS receiver.) The interface may comprise a port for connecting a device using a connection type such as USB, serial, FireWire, SCSI, IDE, RJ11, optical, composite video, component video, or S-video or any other suitable connection type. A media content interface can also include a frame grabber for accessing data from a composite video source. In another example, a transcoder may also be used for accessing data from a composite video source. In one example, the transcoder is implemented in hardware that converts an MPEG-2 file to a streamable format in real-time. An example of such hardware is the Via Technologies MPEG encoding chip provided in the Abocom HA2500 Multimedia Gateway. The same transcoding function could be provided in software. Another example of an interface 136, includes an NTSC converter for converting to digital form data from a VGA port. Another example of an interface 136 includes an analog to digital converter for transforming analog voice signals from a microphone to a digital format, for example a streaming format. An analog to digital converter could also be used to convert an image directly from a video recorder into a digital format. In another example, the interface 136 may comprise a media processing system for converting, encoding and compressing raw video data.

In another example, the interface 136 may comprise a USB port for receiving data from a pen-based data capture system and a pen capture module. In one embodiment, the pen capture module includes ultrasonic pen capture hardware and the multimedia server 104 includes logic to interface with the ultrasonic pen capture system. An example of an ultrasonic pen capture system is one provided by InkLink.

Another embodiment of the interface 136 may include one or more wireless communication interfaces, examples of which may include RF interface(s) such as Bluetooth, 802.11 standards, 802.15 standards, 802.16 standards, satellite communications, and cellular network communications such as 3G and 4G and GPRS. Another wireless example is an infrared (IR) interface.

For more examples of media content interfaces, see U.S. patent application entitled "Printer Having Embedded Functionality for Printing Time-Based Media," filed Mar. 30, 2004 application Ser. No. 10/814,931 which has been incorporated by reference in its entirety.

FIG. 1 further illustrates that optionally, the printer 100 can include one or more embedded data capture modules 168. Examples of data capture devices include an event sensor that receives a signal about or otherwise observes a real-world event (e.g., a motion detector or a sound detector), a video recorder, a digital camera, a film based camera, a microphone, or a signal receiver. Examples of a signal receiver are a cellular telephone receiver, a satellite receiver, or a TV receiver. A data capture module 168 can be communicatively coupled to a media content interface 136 for any processing of its output data, for example converting, encoding or compressing, placing its output data in a form suitable for storage in the multimedia content database 116. A data capture module 168 can also be communicatively coupled to the multimedia server 104 if it outputs data in a suitable form for storage in the database 116.

For more examples of embedded data capture devices, see U.S. patent application entitled "Printer Having Embedded Functionality for Printing Time-Based Media," filed Mar. 30, 2004 application Ser. No. 10/814,931 which has been incorporated by reference in its entirety.

Figure 2:
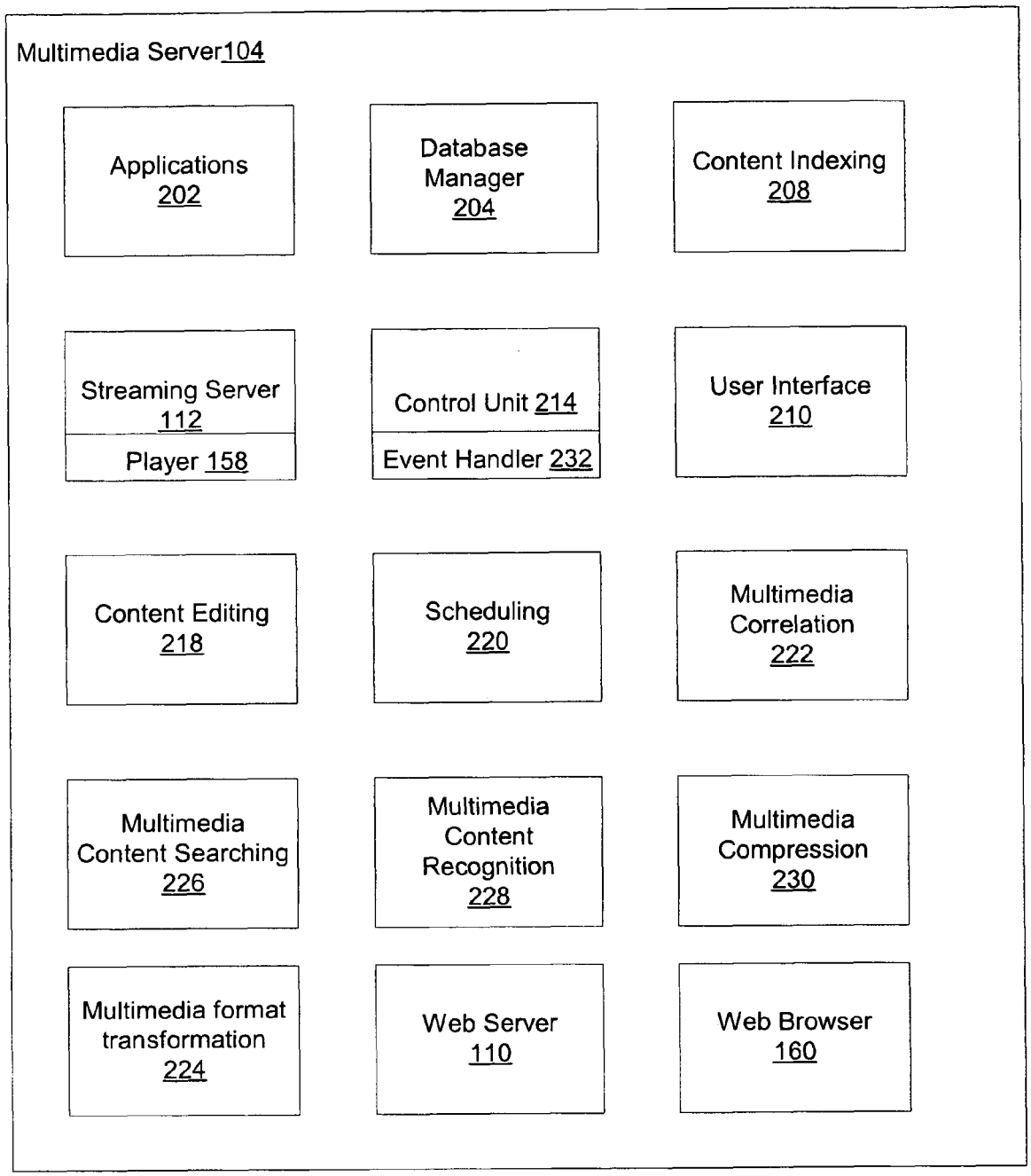
FIG. 2 illustrates a functional software architecture for a multimedia server embedded in a printer in accordance with an embodiment of the present invention.

FIG. 2 illustrates a functional software architecture for a multimedia server 104 embedded in a printer in accordance with an embodiment of the present invention. Various examples of software portions for performing examples of content processing functions are illustrated. In particular implementations, the multimedia server 104 may have only one or only a subset of these types of software portions. The multimedia server 104 comprises a control unit 214 software portion including an event handler 232, the control unit 214 being communicatively coupled to each software portion including, applications software portions 202, a database manager 204, a content indexing software portion 208, a user interface software portion 210, and a network interface manager illustrated here as a web server 110, a streaming server 112 including a streaming data player 158, a web browser 160, a content editing portion 218, scheduling software 220, multimedia correlation software 222, a multimedia format transformation software portion 224, a multimedia content searching software portion 226, a multimedia content recognition software portion 228, and a multimedia compression software portion 230. For purposes of discussion, each of these software portions can either directly or indirectly be invoked by or invoke any other software portion. For example, the scheduling software portion 220 can call the streaming server 112, or a specific application 202 can invoke the multimedia content editing software 218 to perform a specific task such as video clip segmentation based on input parameters.

The control unit 214 software portion provides a centralized management point for the multimedia server 104. Its event handler 232 can be implemented in one example as an application programming interface (API) which receives notifications (e.g. in the form of messages) from the other software portions or interfaces indicating the occurrence of an event. For example, the user interface software 210 processes input from the user input device 152 or input from display 148, which may include a touch screen or have a pointing device such as a mouse or stylus attached to it. The user interface software 210 forwards the input to the event handler 232 which forwards it to the software portion(s) to which it applies. Furthermore, the user interface software 210, updates the display in accordance instructions or data received from another software portion, for example, the web browser 160 in the web server 110. In another example, the scheduling software 220 notifies the event handler 232 that a designated time for printing a content selection has been reached or soon will be. The event handler 232 notifies the database manager 204 which in turn retrieves the content selection into local memory 108, and the control unit 214 sends a message to the print engine 140 which in turn prints the content selection on the designated medium at the designated time.

The database manager 204 stores and retrieves content selections as well as creates meta-data associated with each content selection to identify it or maintain instructions associated with it. An example of a content selection is a video file, an audio file, or a text file.

The application(s) 202 can be user created applications.

The content indexing portion 208 generates a content index document that can be printed as a paper document. The index document can also be printed on other tangible media such as transparency sheets for overhead projectors, film, slides, canvass, glass, stickers, or any other medium that accepts such markings. A paper representation is easy to browse by a user. The information contained in the content index document can take various forms based on criteria established by a user or an application. Examples of information that can be represented in a content index document are an inventory of one or more categories of content selections stored in the database 116 or in the local memory 108 for the multimedia server 104, detected events, a time line of events, the location of key data in the content or information about a transaction (e.g. a relay transmission between a source and a recipient) regarding the content. In one example, an index document includes portions of multimedia content such as audio clips or video clips printed on the paper. Other identifying information can also be included examples of which are titles, names of participants, times, event detected (e.g. door opened.), or size of content selection or portion. In another example, a bar code is included for each clip indicating to a multimedia player reading the content selection the location of the clip on the medium. In one example, bar codes can be provided that fully encode the digital contents of the full resolution key frame. In another example, the bar codes can provide a link to a version stored off-line. A paper document with video images is often called a video paper document. A paper document with audio images is often called an audio paper document. Various examples of index documents, in particular audio paper and video paper are illustrated in the Video Paper patent applications.

The web server 110 provides content to a web browser 160, or any other remote web browser across a network and access for hosts on the World Wide Web or the Internet for the multimedia server 104. A user may access external websites by indicating selections via the display 148 or the input device 152 in conjunction with the display 148 which may be forwarded to the server 110 or to some other server of the Internet.

The streaming server 112 interacts with digital data to be input to format it in a streaming format for display under the control of the player 158. The streaming server 112 can also perform tasks such as monitoring streamed data based on criteria. Examples of criteria include event detection or the elapsing of a time period.

The multimedia content editing portion 218 performs tasks such as segmenting a clip from an audio or a video content selection as well as text editing capabilities or adding sounds or images to a content selection.

The multimedia correlation portion 222 performs tasks such as correlating video content to audio content based on a criteria such as a time period, a location, a participant or other criteria.

The multimedia format transformation portion 224 performs tasks related to transforming content in one format to another format. For example, a portion of text can be converted from html to speech in a streaming audio format or voice XML. Similarly, data from a satellite transmission can be represented on a streaming format for printing to a DVD.

The multimedia compression portion 230 performs services such as compressing content for storage in the database or printing on a removable storage medium (SD) and subsequently decompressing content for playback on the player 158 for example.

The multimedia content recognition software portion 228 performs recognition functions for various forms of media. For example, for audio content, it can apply voice matching methods such as voice signatures, and speech recognition methods. For handwritten text, it can include handwriting recognition methods. For video, it may, for example, employ scene or face recognition methods.

The multimedia content searching software portion 226 performs searching functions for multimedia content. For example, it can perform text searching. Similarly, voice signatures can be searched as well as recognized sounds or faces or other recognized visual images.

The following figures illustrate embodiments of methods for multimedia content processing by an embedded multimedia server in a printer in accordance with the present invention. For illustrative purposes only, the method embodiments illustrated are discussed in the context of the system embodiments of FIG. 1 and/or FIG. 2.

Figure 3:
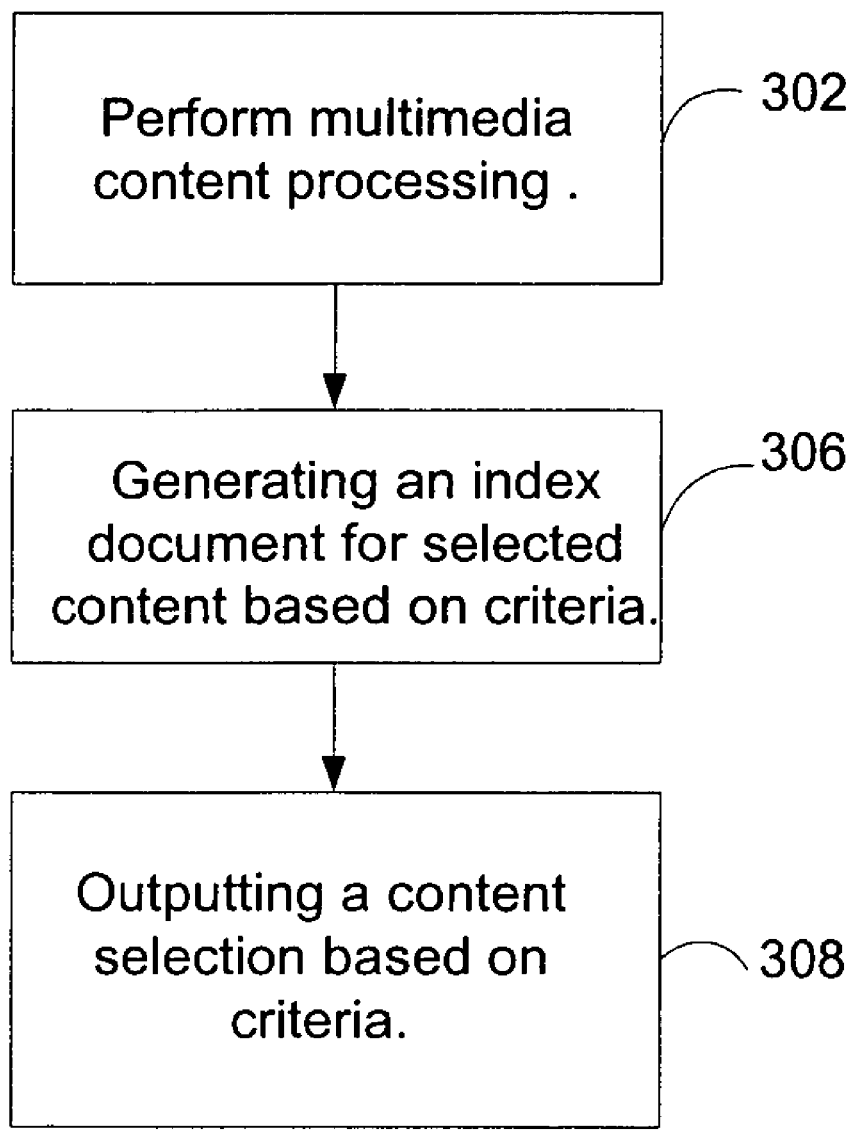
FIG. 3 illustrates a method for processing multimedia content selections for use by a multimedia server embedded in a printer in accordance with an embodiment of the present invention.

FIG. 3 illustrates a computer-implemented method for processing multimedia content selections for use by a multimedia server embedded in a printer in accordance with an embodiment of the present invention. The multimedia server 104 performs 302 multimedia content processing and generates 306 an index document for selected content based on criteria. The multimedia server 104 causes the outputting 308 of a content selection based on criteria. The multimedia server can output 308 a content selection to a device attached via a network such as an external computer 154 or other communication interface such as the speaker 150 in addition to directing the print engine to output the content selection on a removable medium. For example, the multimedia server 104 stores the data provided by the ultrasonic pen system and saves it as a content selection in the database 116. From the display, the user can select to print the information or email it. The multimedia correlation portion 222 links the content selection of the handwriting to other multimedia content including events occurring nearby the printer at the time the user was using the pen system to create the handwriting. For example, the audio or video of others can show that there were two witnesses to a signature. A printout of a generated index document includes barcodes that provide links to this other multimedia recorded at the same time. Packaging this capability in a printer would be useful since it avoids the need to provide a separate PC with this functionality.

Figure 4:
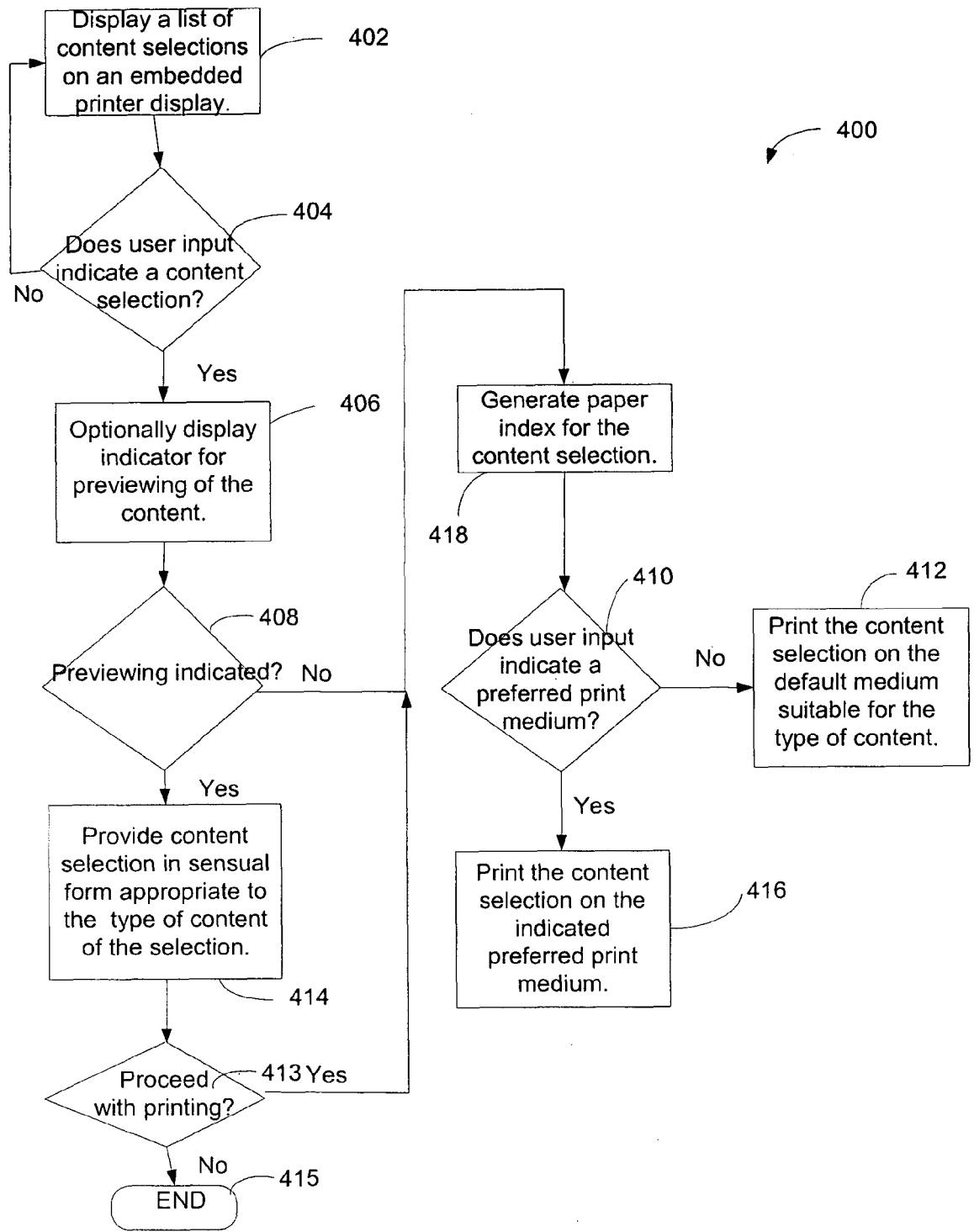
FIG. 4 illustrates a method for printing a multimedia content selection based on criteria for use by a multimedia server embedded in a printer in accordance with an embodiment of the present invention.

FIG. 4 illustrates a method for a multimedia content selection based on criteria for use by a multimedia server embedded in a printer in accordance with an embodiment of the present invention. The user interface software portion 210 displays 402 a list of content selections on an embedded printer display. Consider an example in which the multimedia database 116 includes a music catalog, or a video database, or a movie database or a digital photo catalog, or a combination of one or more of these media types. The user interface software 210 displays a print dialog box on the display 148 which presents the user with a list of the songs, a list of video recordings, a list of movies or a list of photos, resident in the printer 100. The user can choose to "print" any of those songs, videos, movies or photos. Responsive to input indicating 404 a content selection, if previewing is a feature of the printer, optionally the user interface software 210 displays 406 an indicator for previewing the content selected. Responsive to user input indicating 408 previewing is requested, the content selection is provided 414 in the sensual form appropriate to its type. For example, if a song is selected and previewing requested, the event handler 232 sends a message to the streaming server 112 requesting that the song be played. The streaming server 112 requests the song from the database manager 204 which retrieves it from the database 116 where it is stored in this example in a streamed format. Upon receipt, the streaming player 158 streams the song in real-time to a digital to analog converter, the analog output of which is directed to the speaker 150 through which the user hears the song. In a similar fashion, the user interface software 210 displays on display 148 the selected video or movie streamed from the player 158 in real-time, or the selected photo forwarded from the web server 110 or a photo processing application 202. During the previewing of the content selection, a user may have made edits, such as marks or annotations, to the content selection using multimedia content editing software 218 which can be saved to a new version of the content selection temporarily stored in the local memory 108. Other examples of content processing that a user can perform are described in the Media Content Processing applications. Responsive to user input indicating 413 not to proceed with printing, no further action is taken 415 to print the selection. Responsive to user input indicating 413 that outputting is to proceed, the content indexing software portion 208 generates 418 an index document for the content selection. The index paper document can indicate only the marked portions or the whole content selection (See Video Paper patent applications). The print out would be a convenient time-saver allowing one to browse what occurred in a meeting, while away from a network connection that would enable replaying of the digital media. The print out would also be a convenient time-saver allowing one to browse what occurred in a movie, while away from a network connection that would enable replaying of the digital media.

Responsive to user input indicating 410 a preferred print medium, the multimedia server 104 transfers the content selection in a format suitable for that print medium to the print engine (e.g. to local memory 164) which prints 416 the content selection on the indicated preferred medium. If user input does not indicate a preferred medium, the multimedia server 104 transfers the content selection in a format suitable for the default print medium to the print engine which prints 412 the content selection on the default medium suitable for the type of content. In the case of the song catalog, examples of the print medium that can be used are a CD or cassette. In the case of a video or a movie, examples of the print medium that can be used are a DVD or videocassette. In the case of the photos, examples of the print medium that can be used are paper or a memory stick. In one example, the database of content selections can be updated through a network interface 136 by downloading from a web site via the web server 110 for instance. These examples illustrate that this printer could be very useful in a walk-up kiosk as can be found in a convenience store. In another example, the database is communicatively coupled to an internal database (e.g. of company recorded meetings). Additionally, in the example of an embedded digital photo catalog, a user can select pictures for printing or generate an index document of photos without having to turn on a separate computer networked to the printer. For example, if every time a user prints a jpeg image, the printer automatically or under control of the print dialog box, saves a copy of the jpeg on the printer, she can build a personal photo archive and peruse the archive without turning on her desktop computer.

Figure 5:
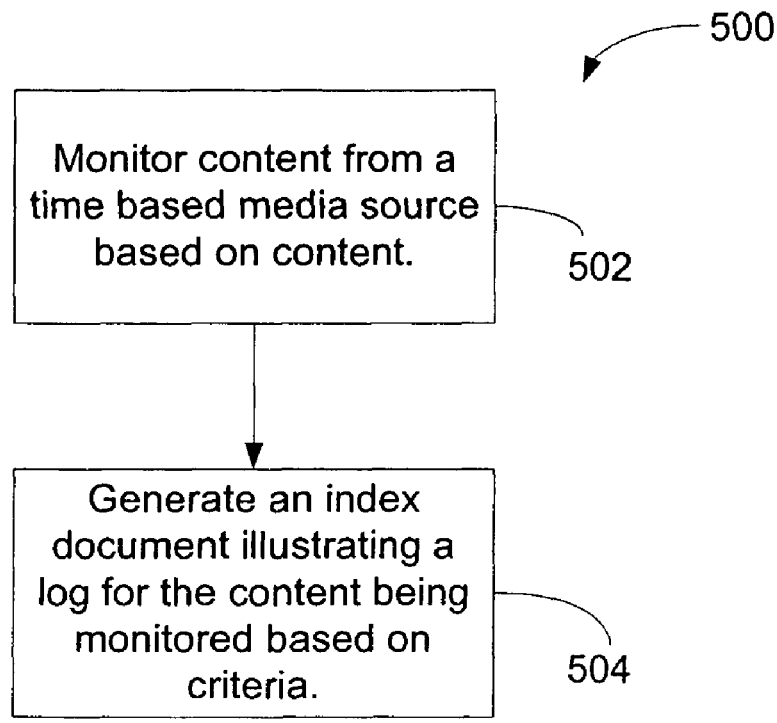
FIG. 5 illustrates a method for monitoring time based data content for use in a printer with an embedded multimedia server in accordance with an embodiment of the present invention.

FIG. 5 illustrates a method for monitoring time based data content for use in a printer with an embedded multimedia server in accordance with an embodiment of the present invention. Monitoring software, for example, the streaming server 112 monitors 502 content from a time-based media source. The content indexing software portion 208 automatically generates 504 an index document illustrating a log for the content being monitored based on criteria. Criteria can be user defined or generated by an application specific software portion and processed by the monitoring software such as the streaming server 112. Consider, for example, a printer with an embedded streaming video monitoring capability such as can be provided by the streaming server 112. A user configures the printer to monitor a streaming video source so that it constructs a storable representation for the streamed data, perhaps playing it through a video card (e.g. 158) and recording the analog output (e.g. using a video recorder 168) to generate a new digital representation (e.g., using an analog digital converter as part of an interface 136), if necessary. A printout is generated that shows a log of the recorded data, perhaps including bar codes that fully encode the digital contents or provide a link to its off-line storage location. Consider another example of a printer with multi-channel streaming video monitoring capability. A user configures the printer, which in this example has multiple processors and a wide bandwidth Internet link to monitor more than one streaming video source simultaneously so that the printer constructs a storable representation for the streamed data, perhaps playing it through more than one video card and recording the analog outputs to generate new digital representations, if necessary. A printout is generated that shows a log of the recorded data from each of the channels, perhaps including bar codes that fully encode the digital contents or provide a link to its off-line storage location. Another example illustrates an embodiment wherein the monitored time based data is streamed audio. In this example, a user configures a printer to monitor a streaming audio site with intermittent broadcasts, such as a surveillance system or scanner. An event sensor may detect a sound of which a monitoring application 202 is notified, and voice detection software that can be part of the multimedia content recognition software 228, can used to distinguish types of sound, for example, a female human voice. Content editing software 218 such as segmentation software is applied to generate 504 a paper index document that shows when people spoke. If voice recognition software 208 is used, its identification results can be indicated on the paper document as well. In one example, the paper document is just a printed activity summary and does not include a means for accessing the digital version of the recording, such as bar codes. In another example, bar codes can be included as well. In another example, the printer can also print the paper document on a removable storage medium that contains the digital data. The bar codes identify to a media player in which the removable medium is inserted and the location of the segments when people spoke.

In another embodiment, the multimedia server 104 acts to monitor interactions with an external computer such as a desktop PC to which it is connected. For example, the video cable from the PC goes to the printer 100 first where the signal is split with one copy going to the PC and another copy to screen capture hardware 136 (e.g. VGA). A PC interaction monitoring application 202 does a differencing between successive frames and saves frames with a difference that exceeds a threshold on secondary storage 114 in the printer. This offloads such processing from the PC, thereby improving responsiveness and user experience, and provides an easily browsable record of a user's activities during the day. The user can choose to print selected frames, hence the relationship to the printer. Print outs can be generated on demand by pressing a button on the printer's console (e.g. 152), a dialog box on the client PC 154 or on the printer's display 148, or at times indicated by scheduling software 220. This printer 100 can be set to produce video files by selecting a frame every predetermined number of seconds irrespective of the content difference. This lets a user watch a replay of what he did. It can also be effectively compressed by the multimedia compression software 230 since the differences between frames are minor. Also, the video can be edited with video editing software 218. Video paper can be generated from the video files.

In another example, user interaction with a keyboard can be determined. In one example, assuming the user has a wireless keyboard and the printer has a wireless keyboard interface 136. A hardware tap into the signals emitted by the keyboard is provided. This tap records everything a user types. Each key click is recorded together with the time stamp when it was received. A timeline representation for a user's activities is constructed that can be printed out or displayed. The display is controlled by a parameter that gives a time gap figure. That is, key clicks less than the threshold are displayed adjacent to one another. Exceeding the threshold inserts a carriage return in the display. Thus if a user types a normal document, the timeline would look similar to that document. But if they frequently stop for phone calls or chatting, the gaps in the time line would indicate that. This display would be a productivity-monitoring tool. It would also be a useful index that could be searched with a full text search engine and would help answer questions like "when did I type this paragraph?" or "when did I revise it?" The time information could be correlated with information from other sources, such as the VGA screen capture, to see what the user had displayed on their screen when they typed or revised that paragraph.

In another example, additional software could be installed on the user's PC 154 that transmits via a network interface 136 or another wired or wireless interface 136 identifiers for files opened, applications invoked, URL's browsed and the names and locations of files sent to the printer. The content indexing software 208 or the PC interaction application 202 can create a document displaying this information that can be displayed or printed out.

In another example, the server 104 has a video camera interface 136 such as a frame grabber that receives composite video signals. The camera monitors activities nearby the printer and saves key frames or video clips in a file on an internal buffer store 108 when activity exceeds a threshold. This threshold can be defined by the difference between successive key frames or by a measure applied to clips extracted from a video stream. For example a clip length parameter (e.g., 30 seconds) is defined. A separate clip is saved automatically every 30 seconds by the video capture hardware 136. That file is closed and the clip capture proceeds. A signal is sent to a daemon process (e.g. 202) that inspects the most recently captured clip and determines whether it should be saved. The daemon could be scheduled so that it wakes up N hours after the clip is captured. This allows a user to see everything that happened, even if no motion was detected. The monitoring application 202 can incorporate a decay factor (which the scheduling software 220 can track) so that initially it keeps everything. Then it deletes clips with no motion at all. And as time goes on it deletes clips with greater and greater motion. Eventually, the clips left show the main activities during that time period, for example, two people standing around the printer fighting over what printout they're supposed to get. In a desktop printer, initially this would delete clips that show no one in the office. Then it would delete clips that show the user sitting at a PC typing (small motion), then it would delete the user moving to pick up the phone. Eventually the clips left show visitors walking in and out of an office. This technology could be used as a burglar-monitoring tool. This system could output video paper that shows key frames with significant events detected by this system and bar codes that point to the video clips.

In another example, the printer can listen to what happens around it. The printer 104 has an audio capture interface (e.g. microphone 168 or connector for a microphone 136, and an audio card 136.) The data is recorded on the printer and time stamped so it can be retrieved by time from the printer 100, for example from the internal web server 110 in the printer 100. In a workgroup setting, this function can record conversations around the printer. It can also record sounds like that made by someone grabbing a printout from the output tray. In a desktop printer, this capability would let the printer monitor conversations in an office between the occupant and visitors or between the occupant and people he talks with on the phone. It could also be programmed to recognize key clicks, phone rings, and the noise made by the printer when it generates paper. The printer could generate an audio or video paper printout that summarizes the audio it captures.

In another example, the printer 100 can monitor the phone numbers called and received as well as record the telephone calls themselves. The printer 100 can be equipped with a RJ-11 pass-through 136 (2 connectors—one for line-in and the other to the desktop phone.)—This allows the printer to tap a phone call, record numbers called, and numbers supplied by caller-id. If audio capture hardware (e.g. microphone 168 and audio to digital converter 136) is also present, this capability lets the printer record phone calls. The printer could provide the beep tone that notifies callers they are being recorded. In any case, this printer 100 could produce a phone log showing the times when calls were placed, their duration, the phone numbers, and bar codes that point to the recorded conversations.

Of course, any of these PC interaction monitoring functions can be combined and their data correlated on a content index document such as a video or audio paper document.

Figure 6:
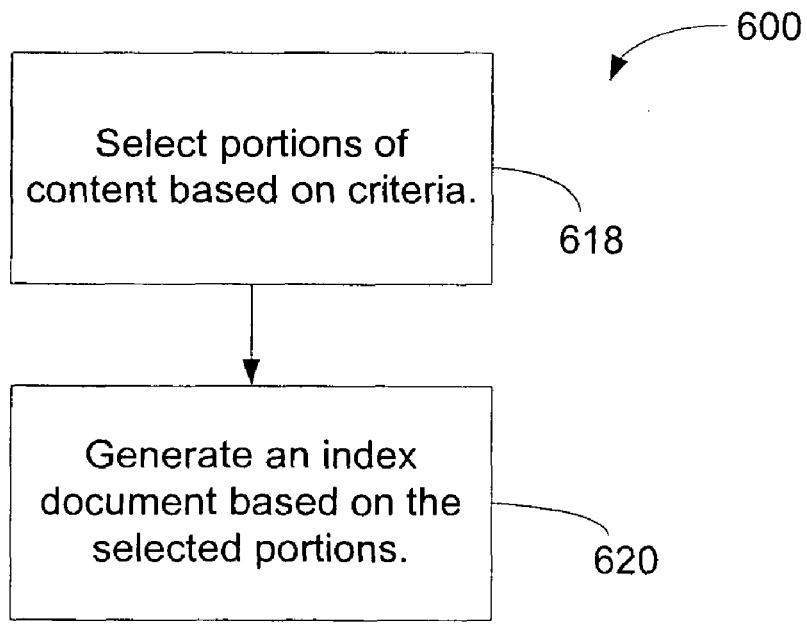
FIG. 6 illustrates a method for editing time based data content for use in a printer with an embedded multimedia server in accordance with an embodiment of the present invention.

FIG. 6 illustrates a method for editing time based data content for use in a printer with an embedded multimedia server in accordance with an embodiment of the present invention. The multimedia content editing software portion 218 selects 618 portions of content based on criteria and automatically generates 620 an index document that is based on the selected portions.

Figures 7, 8:
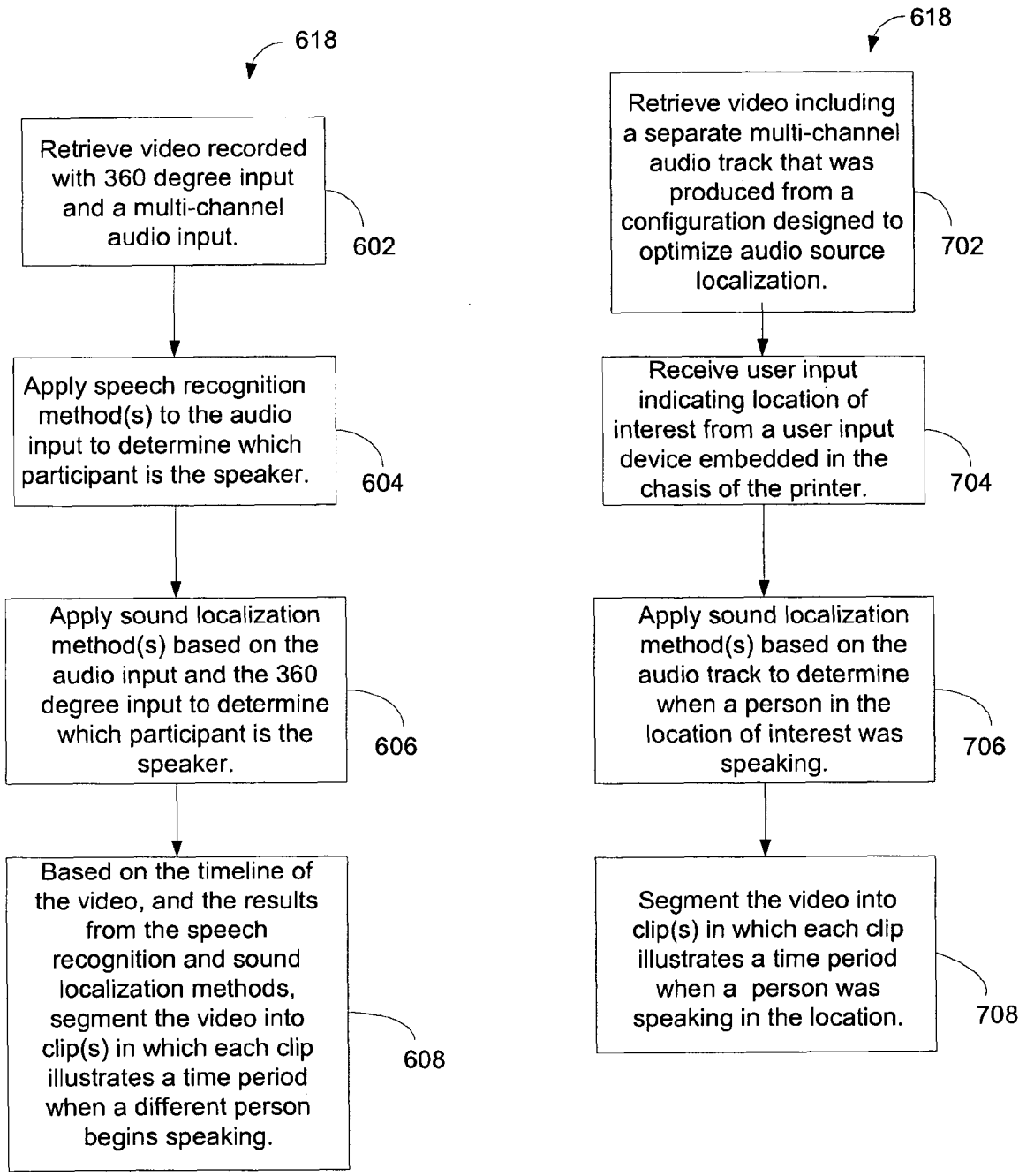
FIG. 7 illustrates an example of a method for printing a video content selection based on user defined criteria wherein the criteria is that each clip indicates a time period in which a different person begins speaking for use in a printer with an embedded multimedia server in accordance with an embodiment of the present invention.
FIG. 8 illustrates an example of a method for printing a video content selection based on user defined criteria wherein the criteria is that each clip indicates a time period in which a person was speaking in the location for use in a printer with an embedded multimedia server in accordance with an embodiment of the present invention.

FIGS. 7 and 8 illustrate examples of methods in accordance with embodiments of the present invention, each of which can be particularly useful for analyzing recorded meetings. In one example, an application 202 may include instructions controlling the implementation of one or more of these embodiments.

FIG. 7 illustrates an example of a method for printing a video content selection based on user defined criteria wherein the criteria is that each clip indicates a time period in which a different person begins speaking for use in a printer with an embedded multimedia server in accordance with an embodiment of the present invention.

Consider an example in which the printer 100 receives time based content data of a video recorded using a 360 degree meeting recorder plus multi-channel audio inputs. The control unit 214 retrieves 602 the video recorded with the 360 degree input and a multi-channel audio input. A meeting recorder application 202 invokes the multimedia content recognition 228 which applies 604 speech recognition method(s) to the audio input to determine which participant is the speaker. Additionally, either the meeting recorder application 202 or the recognition software 228 can apply 606 sound localization method(s) based on the audio input and the 360 degree input to determine which participant is the speaker.

Based on the timeline of the video, and the results from the speech recognition and sound localization methods, the meeting application 202 invokes the content editing software 218 to segment 608 the video into clip(s) in which each clip illustrates a time period when a different person begins speaking. The content indexing software portion 208 generates 620 an index document that shows a key frame every time a different person begins speaking as well as the printed speech recognition results.

FIG. 8 illustrates an example of a method for printing a video content selection based on user defined criteria wherein the criteria is that each clip indicates a time period in which a person was speaking in the location for use in a printer with an embedded multimedia server in accordance with an embodiment of the present invention. Consider another example in that the meeting video includes a separate multi-channel audio track that was produced from a known configuration of microphones designed to optimize audio source localization. The control unit 214 retrieves 702 video including a separate multi-channel audio track that was produced from a configuration designed to optimize audio source localization. The user interface portion 210 receives 704 user input indicating location of interest from a user input device embedded in the chassis of the printer. Based on the user input, either the meeting recorder application 202 or the recognition software 228 can apply 706 sound localization method(s) based on the audio track to determine when a person in the location of interest was speaking. Based on the timeline of the video, and the sound localization results, the meeting application 202 invokes the content editing software 218 to segment 708 the video into clips(s) in which each clip illustrates a time period when a person was speaking in the location. The content indexing software portion 208 generates 620 an index document illustrating key frames which can also include bar codes for the selected clips.

Figures 9, 10:
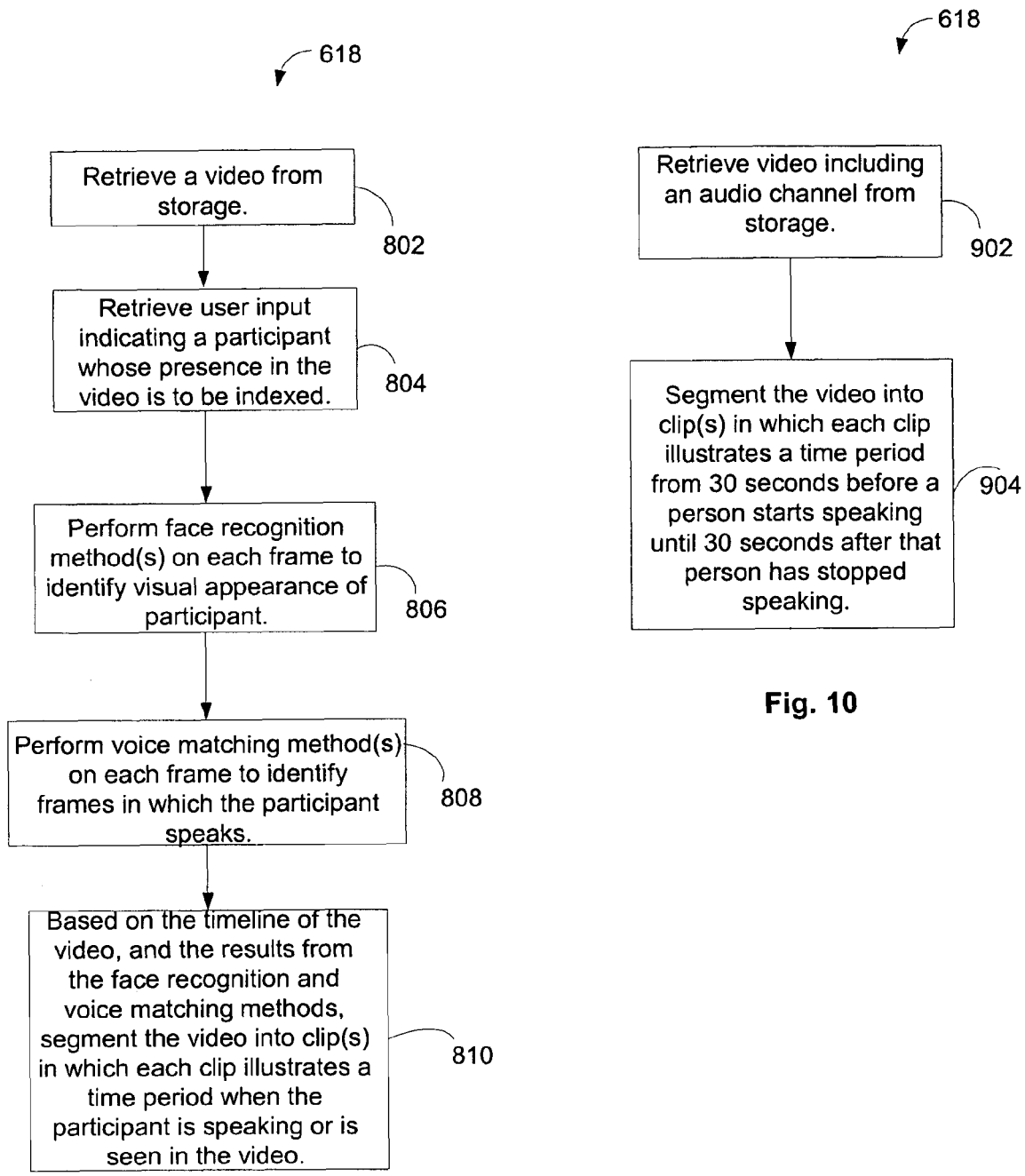
FIG. 9 illustrates an example of a method for printing a video content selection based on user defined criteria wherein the criteria is that each clip indicates a time period in which a participant is present in a video selection for use in a printer with an embedded multimedia server in accordance with an embodiment of the present invention.
FIG. 10 illustrates an example of a method for printing a video content selection based on user defined criteria wherein the criteria is that each clip indicates a time period in which a person was speaking in a video for use in a printer with an embedded multimedia server in accordance with an embodiment of the present invention.

FIG. 9 illustrates an example of a method for printing a video content selection based on user defined criteria wherein the criteria is that each clip indicates a time period in which a participant is present in a video selection for use in a printer with an embedded multimedia server in accordance with an embodiment of the present invention. Consider another example in which the printer edits time based content for identifying and cataloging the presence of an entity such as a participant in the content. This method can be embodied in an entity identification application 202. The control unit 214 retrieves 802 a video from storage and retrieves 804 user input indicating a participant whose presence in the video is to be indexed. The entity identification application 202 or the recognition software 228 performs 806 face recognition method(s) on each frame to identify a visual appearance of a participant. The recognition software 228 performs 808 voice matching method(s) on each frame to identify frames in which the participant speaks. Based on the timeline of the video, and the results from the face recognition and voice matching methods, the entity identification application 202 invokes the content editing software 218 to segment 810 the video into clip(s) in which each clip illustrates a time period when the participant is speaking or is seen in the video. The content indexing software portion 208 generates 620 an index document illustrating or referencing the selected clips indicating the participant's presence. Printouts can be generated that list every appearance of a given participant. An example application would be "printing" a TV program and generating a list of every appearance of a given actor.

FIG. 10 illustrates an example of a method for printing a video content selection based on user defined criteria wherein the criteria is that each clip indicates a time period in which a person was speaking in a video for use in a printer with an embedded multimedia server in accordance with an embodiment of the present invention. Consider another example in which the printer automatically segments time-based media into clips based on events in an audio channel. For example, every time someone speaks, the system constructs a clips that spans the time from 30 seconds before the person started speaking until 30 seconds after they stopped speaking. This would be useful for "print" surveillance videos where there are long periods where no one says anything and brief times when someone in the field of view says something. This method can be embodied in an event detection application 202 The control unit 214 retrieves 902 video including an audio channel from storage. Based on the timeline of the audio channel, and the detection of an audio event, the event detection application 202 invokes the content editing software 218 to segment 904 the video into clip(s) in which each clip illustrates a time period from 30 seconds before a person starts speaking or another audio event occurs until 30 seconds after that person has stopped speaking or the event has ended. This method can of course be applied to detection of other events such as changes in the field of view of an image capture device.

As meetings are often based around presentations, a method for editing content from a captured presentation for use in a printer with an embedded multimedia server in accordance with another embodiment of the present invention is complementary and of course can also be used independently. This method can be embodied in a presentation capture application 202 in the embodiment of FIG. 2. Consider the example in which the printer 100 has VGA-to-NTSC conversion hardware 136 and audio capture capabilities 168, 136. A user plugs a laptop into one side of the printer and plugs a projector into the other. The printer 100 captures video frames as fast as presentation capture software 202 compares or has them compared to the most recently captured frame, and retains those frames that are different. A parallel audio track is also saved. This presentation capture capability could also be used in a desktop printer to record a presentation made on a PC connected to the printer. For example, someone practicing a presentation would be a potential user. It could also be used to record activities on a PC during a critical time, e.g., while developing code. Off-loading these functions to the printer significantly reduces the computational load on the PC. The content indexing software 208 creates a video paper representation that shows the frames and/or bar codes that allow the user to replay the audio associated with the frames. The printer can serve the audio itself or it can be written to a digital medium like an SD disk that can be played from a cell phone or a PDA. The audio could also be written to a 2D bar code. Packaging these functions in the printer provides a convenient and easy-to-use a presentation recorder.

In another version, the printer receives video of people nearby a printer. In this example, a user is giving a presentation near the printer or working on his or her PC. This adds significant information to the recording. The data is saved on the printer. Key frames are chosen from the video stream and added to the video paper printout.

Figure 11:
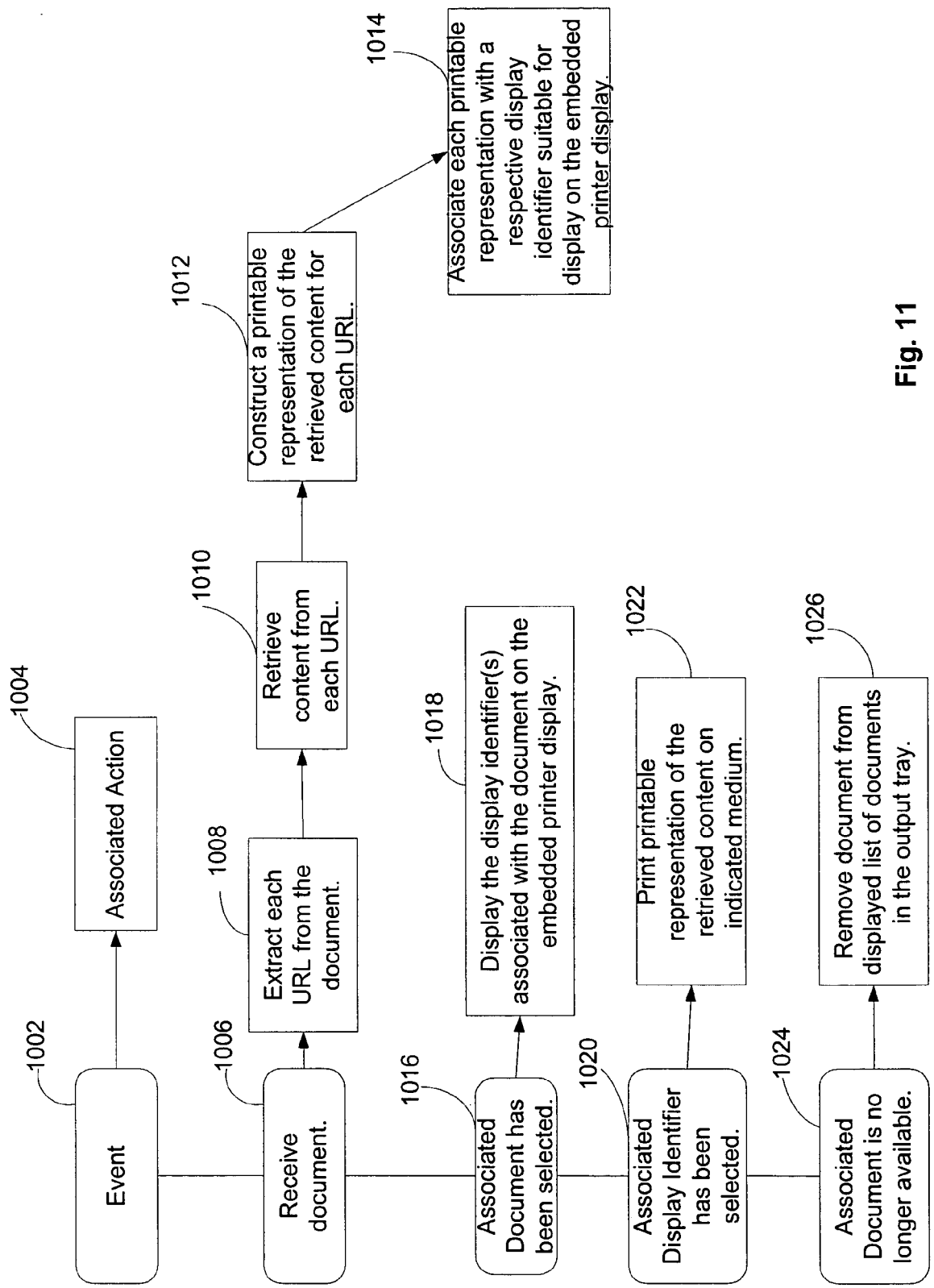
FIG. 11 illustrates an example of a method for capturing referenced multimedia content in a content selection designated for printing for use in a printer with an embedded multimedia server in accordance with an embodiment of the present invention.

FIG. 11 illustrates an example of a method for capturing referenced multimedia content in a content selection designated for printing for use in a printer with an embedded multimedia server in accordance with an embodiment of the present invention. The illustrative example in this context is that the printer automatically extracts URL's from the documents (e.g. embodied as postscript files) it receives for printing. In the embodiment of FIG. 1, the web server 110 fetches the referenced content at the URL and constructs a printable representation, for example converting HTML to PDF. The multimedia server 104 constructs thumbnail images for the referenced content, for example WebPages, suitable or specialized for display on the printer's display 148 perhaps with Ricoh's SmartNails technology. The display 148 presents the user with a list of the documents that the printer 100 has identified are in its output tray. The user chooses his document and is presented with a list of pre-fetched URL references that can be printed on the spot because they've been pre-fetched.

The multimedia server 104 receives events 1002 and directs them to the appropriate software portion for performing an associated action 1004. The multimedia server 104 receives 1006 a document identified for printing. The server searches the document for references to online content. URL's are examples of references used for this example. The server 104 extracts 1008 each URL from the document, and the web server 110 retrieves 1010 content from each URL. The multimedia server 104 constructs 1012 a printable representation of the retrieved content for each URL and associates 1014 each printable representation with a respective display identifier suitable for display on the embedded printer display 148. Responsive to the event that the document associated with a set of retrieved content has been selected 1016, the multimedia server 104 displays 1018 the display identifier(s) associated with the document on the embedded printer display 148. Responsive to an associated display identifier having been selected 1020, the multimedia server 104 directs the print engine 140 to print 1022 a printable representation of the retrieved content on an indicated medium. Responsive to an indication that the associated document is no longer available 1024, the multimedia server 104 updates the display 148 to remove 1026 the document from the displayed list of documents in the output tray.

Figure 12:
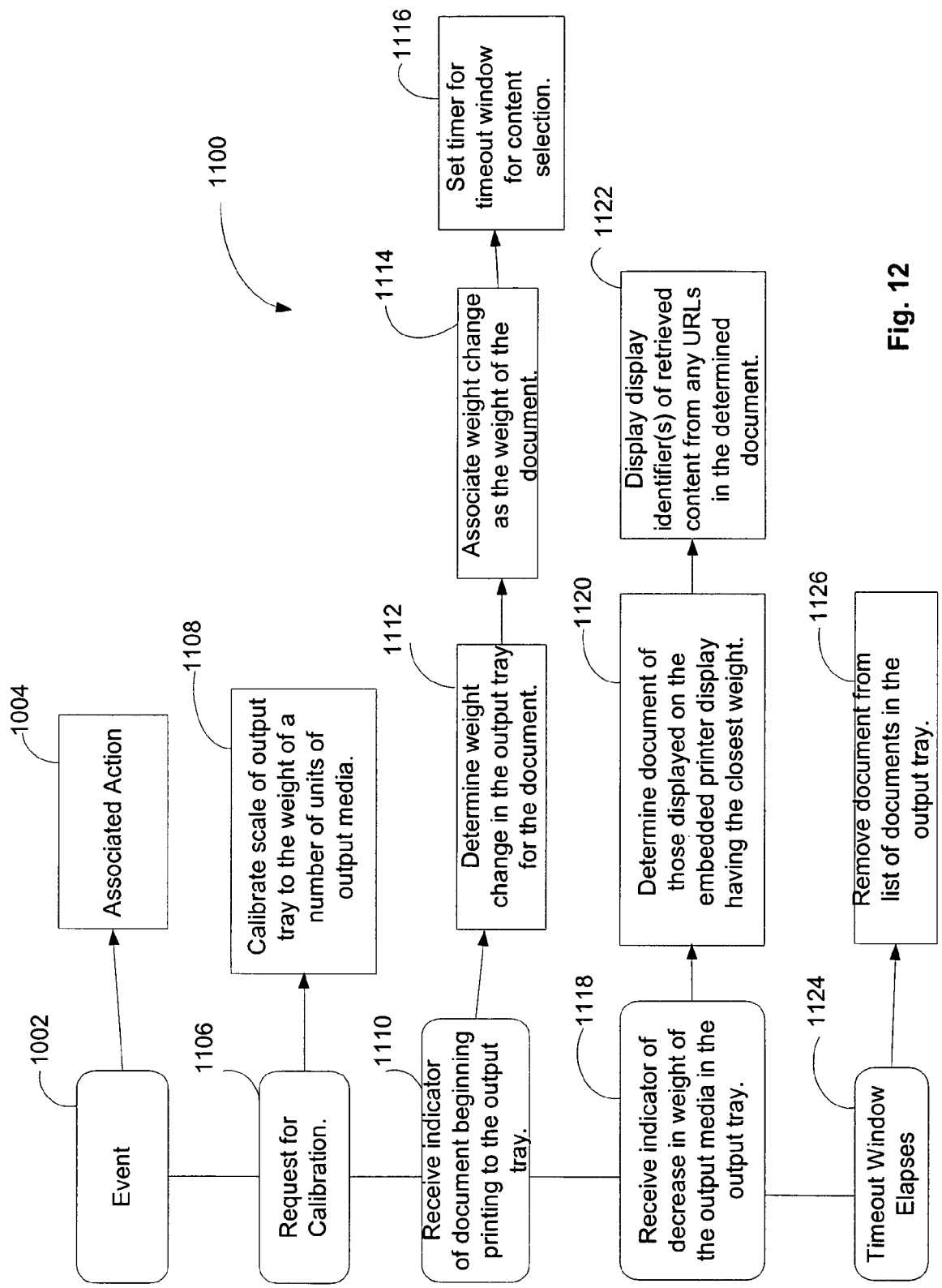
FIG. 12 illustrates an example of a method for determining whether a printed content selection has been removed from an output holder for use in a printer with an embedded multimedia server in accordance with an embodiment of the present invention.

FIG. 12 illustrates an example of a method for determining whether a printed content selection has been removed from an output holder for use in a printer with an embedded multimedia server in accordance with an embodiment of the present invention. In this example, the estimation of the documents in the tray and the documents pulled out of the tray is done by weight, as the output tray in this embodiment includes a scale [not shown] that can compute the weight of the sheets of paper it holds. From this it estimates the number of sheets in the output tray. It knows when a user withdraws paper a change in weight. The document choices presented the arriving user can expire after N hours. When the user withdraws a document but leaves others in the tray, the list of choices is modified so that the best guess is highlighted or moved to the top of the list. For example, if one user prints a ten page document and another user prints a five page document, the output tray would weigh 15 pages. When the 5 page document is withdrawn it would weigh 10 pages thereby allowing the printer to estimate that the URL's in the 5-page document should be displayed.

Again, the multimedia server 104 receives events 1002 and directs them to the appropriate software portion for performing an associated action 1004. Responsive to receiving a request for Calibration 1106, the multimedia server 104 calibrates 1108 or directs the print engine 140 to calibrate 1108 the scale of output tray to the weight of a number of units of output media. Responsive, to receiving 1110 an indicator of a document beginning printing to the output tray, the print engine 140 determines 1112 the weight change in the output tray, and associates 1114 the weight change as the weight of the document. The multimedia server is notified that the associated document is in the output tray, and it sets 1116 a timer for a timeout window for pickup of the document. Responsive to receiving 1118 an indicator of decrease in weight of the output media in the output tray, software executed by either the print engine 140 or the server 104 determines 1120 which document identified as in the tray has the closest weight, and the multimedia server 104 displays 1122 the display identifier(s) of retrieved content from any URLs in the determined document. Responsive to the timeout window elapsing 1124, the multimedia server removes 1126 the document from displayed list of documents in the output tray.

In another embodiment, the printer 100 provides an embedded text-to-speech system. This provides an aid for the visually impaired, for example a TTS capability. The user interface 152 can include a button requesting that a text document be read in an audio form. In another embodiment, the printer 100 includes a microphone 168 for receiving speech commands requesting the reading of a document in audio form. Text to speech software can generate an audio version of the document which is transmitted to the speaker 150. A user who prints a text file or web page can walk up to a printer and listen to the contents of the file while it is being printed or previewed. The output of this system could also be previewed in a print dialog box. In another example, the multimedia server 104 delivers the audio version to a networked external computer 154.

In another embodiment, the text to speech software can read a summary of a document either while standing in front of the printer or at a networked computer before deciding to generate a paper printout. The output of this system could also be previewed in a print dialog box.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

The invention claimed is:

1. A printer with an embedded multimedia server for printing time-based media comprising:
    a chassis for housing:
        a print engine within the printer for generating a printout of a storage representation and controlling printing to a plurality of storage media forms, including removable storage media forms, the print engine being coupled to media holders and an output module;
        a monitoring module within the printer for monitoring streaming media content from a time-based media source input;
        the embedded multimedia server within the printer for selecting a portion of the monitored streaming media content based on a plurality of user defined criteria and for interfacing with interfaces for multiple types of media content, the embedded multimedia server being communicatively coupled to the monitoring module, the plurality of user defined criteria comprising segmented clips from the monitored media content wherein the segmented clips include one or more speakers speaking in the segmented clips, the embedded multimedia server determining which of the one or more speakers is speaking;
        a content indexing module within the printer for indexing the selected portion of the streaming media content based on the one or more speakers speaking in the selected portion of the streaming media content; and
        the output module within the printer communicatively coupled to the embedded multimedia server for constructing the storable representation of the selected portion of the streaming media content.

2. The printer of claim 1, further comprising:
    a network interface communicatively coupled to the embedded multimedia server for receiving a document in a print job;
    the embedded multimedia server further comprising:
        a content processing module for extracting a Uniform Resource Locator from the document;
        a web server for retrieving a content web page identified by the Uniform Resource Locator referenced in the document;
    the output module constructing a printable web content representation of the retrieved content web page;
    an embedded printer display for displaying a thumbnail image associated with the web content printable representation constructed by the embedded multimedia server; and
    the print engine for making the web content printable representation available for printing to a selected printable medium responsive to the thumbnail image being selected in the embedded printer display.

3. The printer of claim 1, wherein the print engine further comprises a removable storage medium format writer for electronic storage mediums.

4. The printer of claim 3, wherein the medium format writer is a digital video disc (DVD) writer.

5. The printer of claim 1, wherein the print engine further comprises a removable storage medium format writer for optical storage mediums.

6. The printer of claim 1, wherein at least one of the media holders is a bandolier configured for holding a removable storage medium.

7. The printer of claim 1, wherein the streaming media content from the time-based media source comprises multi-channel streaming media content.

8. The printer of claim 1, further comprising a content editing module for automatically segmenting the streaming media content into a plurality of media clips based on an event in an audio channel associated with the streaming media.

9. The printer of claim 1, wherein the output module produces a removable storage medium comprising digital data corresponding to the storable representation and generates a bar code adapted to identify the selected portion of the streaming media content in the removable storage medium.

10. The printer of claim 1, further comprising:
    a user interface module for receiving user input to the printer indicating a participant speaker of a recorded video meeting;
    the embedded multimedia server comprising:
        a content recognition module for performing multimedia content recognition on the streaming media content to determine one or more speakers in the recorded video meeting;
        a content editing module for segmenting the streaming media content into a plurality of media clips based on which of the one or more speakers is speaking in the recorded video meeting; and
        a content selection module for selecting a media clip from the plurality of media clips based on the plurality of user defined criteria, the plurality of user defined criteria comprising a time period when the participant speaker is the one or more speakers speaking in the recorded video meeting;
    the output module constructing a storable media clip representation for the selected media clip; and
    the print engine generating a printout of the storable media clip representation.

11. The printer of claim 10, wherein the content recognition module applies a speech recognition method to determine an identity of the one or more speakers in the recorded video meeting.

12. The printer of claim 10, wherein the content recognition module applies a face recognition method to identify a visual appearance of the one or more speakers in the recorded video meeting.

13. The printer of claim 10, wherein the content recognition module applies a voice matching method to identify a voice of the one or more speakers in the recorded video meeting.

14. The printer of claim 10, wherein
    the user interface module receives a user input indicating a location of the participant speaker;
    the content editing module segments the streaming media content into the plurality of media clips based on locations associated with the one or more speakers in the recorded video meeting; and
    the content selection module selects the media clip illustrating a time period when the location associated with the one or more speakers in the recorded video meeting is the location of the participant speaker.

15. The printer of claim 10, wherein the content recognition module applies a sound localization method to determine the locations associated with the one or more speakers in the recorded video meeting.

16. In a printer with an embedded multimedia server, a method for printing time-based media content comprising:
    performing, by the printer, multimedia content processing, comprising:
        monitoring streaming media content from a time-based media source input to the printer;
        selecting a portion of the streaming media content based on a plurality of user defined criteria comprising segmented clips from the monitored media content wherein the segmented clips include one or more speakers speaking in the segmented clips;

determining which of the one or more speakers is speaking;

indexing the selected portion of the streaming media content based on the one or more speakers speaking in the selected portion of the streaming media content;

constructing a storable representation for the selected portion of the streaming media content; and generating using the printer a printout of the storable representation.

17. The method of claim 16, wherein the streaming media content from the time-based media source comprises multichannel streaming media content.

18. The method of claim 16, wherein:

monitoring the streaming media content from the time-based media source input to the printer comprises monitoring video signals via a video camera interface;

the video signals capture motions of one or more persons located near the printer; and the printout of the storable representation corresponds to the captured motions, and is generated on a video paper.

19. The method of claim 16, wherein:

monitoring the streaming media content from the time-based media source input to the printer comprises monitoring audio data via an audio capture interface;

wherein the audio data captures audio sounds recorded around the printer; and the printout of the storable representation corresponds to the captured audio data, and is generated on an audio paper.

20. The method of claim 16, further comprising automatically segmenting the streaming media content into a plurality of media clips based on an event in an audio channel associated with the streaming media.

21. The method of claim 16, wherein generating the printout of the storable representation comprises producing a removable storage medium comprising digital data corresponding to the storable representation, and further comprises generating a bar code adapted to identify the selected portion of the streaming media content in the removable storage medium.

22. The method of claim 16, wherein the step of generating the printout of the storable representation comprises generating an audio form of the document by an embedded text-to-speech application.

23. The method of claim 16, further comprising:

receiving user input to the printer indicating a participant speaker of a recorded video meeting;

performing multimedia content recognition on the streaming media content to determine one or more speakers in the recorded video meeting;

segmenting the streaming media content into a plurality of media clips based on which of the one or more speakers is speaking in the recorded video meeting;

indexing the plurality of media clips by the one or more speakers in the recorded video meeting;

wherein selecting the portion of the streaming media comprises selecting a media clip from the plurality of media clips and the plurality of user defined criteria comprise a time period when the participant speaker is the one or more speakers speaking in the recorded video meeting;

constructing a storable media clip representation for the selected media clip; and generating a printout of the storable media clip representation.

24. The method of claim 23, wherein performing multimedia content recognition comprises applying a speech recognition method to determine an identity of the one or more speakers in the recorded video meeting.

25. The method of claim 23, wherein performing multimedia content recognition comprises applying a face recognition method to identify a visual appearance of the one or more speakers in the recorded video meeting.

26. The method of claim 23, wherein performing multimedia content recognition comprises applying a voice matching method to identify a voice of the one or more speakers in the recorded video meeting.

27. The method of claim 23, wherein the user input indicates a location of the participant speaker;

segmenting the streaming media content into the plurality of media clips is based on locations associated with the one or more speakers in the recorded video meeting; and selecting the media clip from the plurality of media clips comprises selecting the media clip illustrating a time period when the location associated with the one or more speakers in the recorded video meeting is the location of the participant speaker.

28. The method of claim 27, wherein performing multimedia content recognition comprises applying a sound localization method to determine the locations associated with the one or more speakers in the recorded video meeting.

29. The method of claim 16, further comprising:

receiving a document in a print job;

extracting a Uniform Resource Locator from the document;

retrieving a content web page identified by the Uniform Resource Locator referenced in the document;

constructing a printable web content representation of the retrieved content web page;

associating the printable web content representation with a thumbnail image; and displaying the associated thumbnail image in an embedded printer display of the printer.

30. The method of claim 29, further comprising:

responsive to the associated thumbnail image being selected, making the printable web content representation available for printing to a selected printable medium.

31. The method of claim 29, further comprising:

receiving an indication that the retrieved content web page has become unavailable; and updating the embedded printer display to remove the thumbnail image associated with the retrieved content web page.

32. The method of claim 29, further comprising:

determining that the document in the print job is removed from an output tray of the printer;

estimating a number of sheets removed from the output tray based on a change in a weight of sheets in the output holder;

identifying the removed document based on the estimated number of sheets removed from the output tray; and highlighting the thumbnail image associated with the printable web content representation of the content web page referenced in the removed document.

33. The method of claim 29, further comprising:

setting a timeout window for removing the document in the print job from an output tray of the printer; and responsive to the timeout window lapsing, removing the thumbnail image associated with the document from the embedded printer display.

34. A computer program product for printing time-based media content processed by a multimedia server embedded in a printer, the computer program product comprising:
   a computer-readable storage medium; and
   computer program code, coded on the storage medium, comprising:
      a monitoring module for monitoring streaming media content from a time-based media source input;
      an embedded multimedia server for selecting a portion of the streaming media content monitored by the monitoring module based on a plurality of user defined criteria and for interfacing with interfaces for multiple types of media content, the embedded multimedia server being communicatively coupled to the monitoring module, the plurality of user defined criteria comprising segmented clips from the monitored media content wherein the segmented clips include one or more speakers speaking in the segmented clips, the embedded multimedia server determining which of the one or more speakers is speaking;
      a content indexing module for indexing the selected portion of the streaming media content based on the one or more speakers speaking in the selected portion of the streaming media content;
      an output module communicatively coupled to the embedded multimedia server for constructing a storable representation for the selected portion of the streaming media content; and
      a print engine for controlling printing to a plurality of storage media forms, including removable storage media forms, the print engine communicatively coupled to the output module for generating a printout of the storable representation.

35. The computer program product of claim 34, further comprising:
   a user interface module for receiving user input to the printer indicating a participant speaker of a recorded video meeting;
   the embedded multimedia server further comprising:
      a content recognition module for performing multimedia content recognition on the streaming media content to determine one or more speakers in the recorded video meeting;
      a content editing module for segmenting the streaming media content into a plurality of media clips based on which of the one or more speakers is speaking in the recorded video meeting; and
      a content selection module for selecting a media clip from the plurality of media clips based on the plurality of user defined criteria, the plurality of user defined criteria comprising a time period when the participant speaker is the one or more speakers speaking in the recorded video meeting;
   the content indexing module indexing the plurality of media clips by the one or more speakers in the recorded video meeting;
   the output module constructing a storable media clip representation for the selected media clip; and
   the print engine generating a printout of the storable media clip representation.

36. The computer program product of claim 35, wherein
   the user interface module receives a user input indicating a location of the participant speaker;
   the content editing module segments the streaming media content into the plurality of media clips based on locations associated with the one or more speakers in the recorded video meeting; and
   the content selection module selects the media clip illustrating a time period when the location associated with the one or more speakers in the recorded video meeting is the location of the participant speaker.

37. The computer program product of claim 34, further comprising computer program code embodied therein for:
   receiving a document in a print job;
   extracting a Uniform Resource Locator from the document;
   retrieving a content web page identified by the Uniform Resource Locator referenced in the document;
   constructing a printable web content representation of the retrieved content web page;
   associating the printable web content representation with a thumbnail image;
   displaying the associated thumbnail image in an embedded printer display of the printer; and
   responsive to the associated thumbnail image being selected, making the web content printable representation available for printing to a selected printable medium.

38. The computer program product of claim 37, further comprising computer program code for:
   determining that the document in the print job is removed from an output tray of the printer;
   estimating a number of sheets removed from the output tray based on a change in a weight of sheets in the output holder;
   identifying the removed document based on the estimated number of sheets removed from the output tray; and
   highlighting the thumbnail image associated with the printable web content representation of the content web page referenced in the removed document.

39. The computer program product of claim 37, further comprising computer program code for:
   setting a timeout window for removing the document in the print job from an output tray of the printer;
   responsive to the timeout window lapsing, removing the thumbnail image associated with the document from the embedded printer display.

40. The printer of claim 1, wherein the content indexing module generates a content index document for printing on a tangible media.

* * * * *